United States Patent
Nam et al.

(10) Patent No.: US 10,789,762 B2
(45) Date of Patent: Sep. 29, 2020

(54) METHOD AND APPARATUS FOR ESTIMATING PARAMETER OF VIRTUAL SCREEN

(71) Applicant: SAMSUNG ELECTRONICS CO., LTD., Suwon-si (KR)

(72) Inventors: Dong Kyung Nam, Yongin-si (KR); Hyoseok Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 42 days.

(21) Appl. No.: 16/103,416

(22) Filed: Aug. 14, 2018

(65) Prior Publication Data

US 2019/0172250 A1 Jun. 6, 2019

(30) Foreign Application Priority Data

Dec. 6, 2017 (KR) .................. 10-2017-0166725

(51) Int. Cl.
*G06T 15/20* (2011.01)
*G06T 3/60* (2006.01)
(Continued)

(52) U.S. Cl.
CPC .............. *G06T 15/20* (2013.01); *G06T 3/60* (2013.01); *G06T 7/70* (2017.01); *G06T 7/74* (2017.01);
(Continued)

(58) Field of Classification Search
CPC ......... G06T 19/006; G06T 15/20; G06T 7/70; G06T 7/74; G06T 7/80; G06T 3/60; G06T 2207/30208
See application file for complete search history.

(56) References Cited

U.S. PATENT DOCUMENTS

| 5,504,622 A | 4/1996 | Oikawa et al. |
| 7,369,101 B2 | 5/2008 | Sauer et al. |

(Continued)

FOREIGN PATENT DOCUMENTS

| DE | 102013219556 A1 * | 4/2015 |
| DE | 102013219556 A1 | 4/2015 |

(Continued)

OTHER PUBLICATIONS

DE102013219556A1 (Machine Translation on Nov. 15, 2019) (Year: 2019).*

(Continued)

*Primary Examiner* — Michael Le
(74) *Attorney, Agent, or Firm* — Sughrue Mion, PLLC

(57) ABSTRACT

A method and an apparatus for estimating a parameter of a virtual screen are disclosed. The method includes determining first transformation parameters of virtual cameras relative to a reference camera of the virtual cameras based on transformation parameters of the virtual cameras relative to a physical pattern, determining second transformation parameters of the virtual cameras relative to the reference camera based on transformation parameters of the virtual cameras relative to a virtual pattern, and estimating a size parameter of a virtual screen based on the first transformation parameters and the second transformation parameters.

21 Claims, 21 Drawing Sheets

(51) Int. Cl.
*G06T 7/70* (2017.01)
*G06T 19/00* (2011.01)
*G06T 7/80* (2017.01)
*G06T 7/73* (2017.01)

(52) U.S. Cl.
CPC .............. *G06T 7/80* (2017.01); *G06T 19/006* (2013.01); *G06T 2207/30208* (2013.01)

(56) References Cited

U.S. PATENT DOCUMENTS

| | | | |
|---|---|---|---|
| 2011/0050887 A1* | 3/2011 | Nelson | H04N 9/31 348/135 |
| 2013/0182083 A1* | 7/2013 | Grossmann | H04N 13/327 348/51 |
| 2015/0373279 A1* | 12/2015 | Osborne | G02B 13/0075 348/36 |
| 2016/0377873 A1 | 12/2016 | Kmura | |
| 2016/0379600 A1 | 12/2016 | Jin | |
| 2017/0041592 A1 | 2/2017 | Hwang et al. | |
| 2017/0160546 A1 | 6/2017 | Bull et al. | |

FOREIGN PATENT DOCUMENTS

| | | |
|---|---|---|
| EP | 3128484 A2 | 2/2017 |
| EP | 3147150 A1 | 3/2017 |
| JP | 2010-70066 A | 4/2010 |
| JP | 2017-49658 A | 3/2017 |
| KR | 10-2016-0060439 A | 5/2016 |
| KR | 10-2016-0069451 A | 6/2016 |
| KR | 10-2017-0066749 A | 6/2017 |

OTHER PUBLICATIONS

Hwang. "Lenticular Lens Parameter Estimation Using Single Image for Crosstalk Reduction of Three-dimensional Multi-view Display", Jul. 29, 2015 (Year: 2015).*

Zhang. "A Flexible New Technique for Camera Calibration," Technical Report, MSR-TR-98-71. IEEE Transactions on Pattern Analysis and Machine Intelligence, 22(11), 2000 (Year: 2000).*

Communication dated Jan. 24, 2019, issued by the European Patent Office in counterpart European Application No. 18183345.0.

Folker Wientapper et al., "A Camera-Based Calibration for Automotive Augmented Reality Head-Up-Displays", 2013 IEEE International Symposium on Mixed and Augmented Reality(ISMAR), Oct. 1, 2013, pp. 189-197 (10 pages total).

* cited by examiner

100

FIG. 5
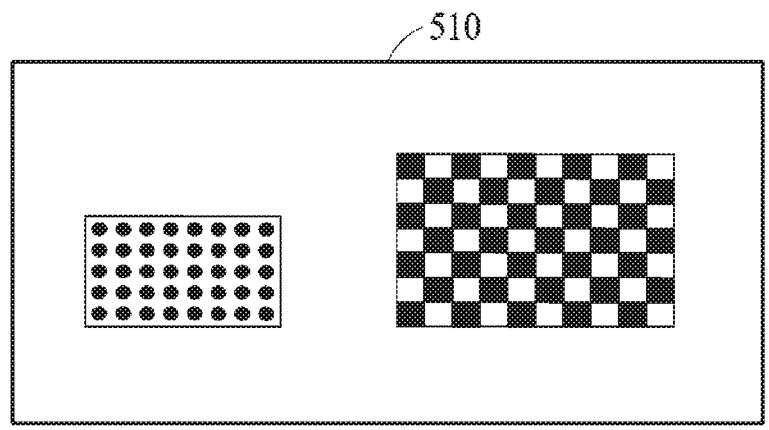
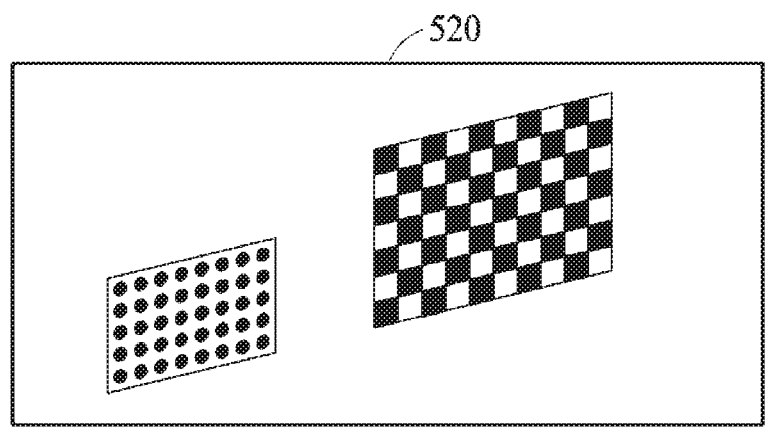
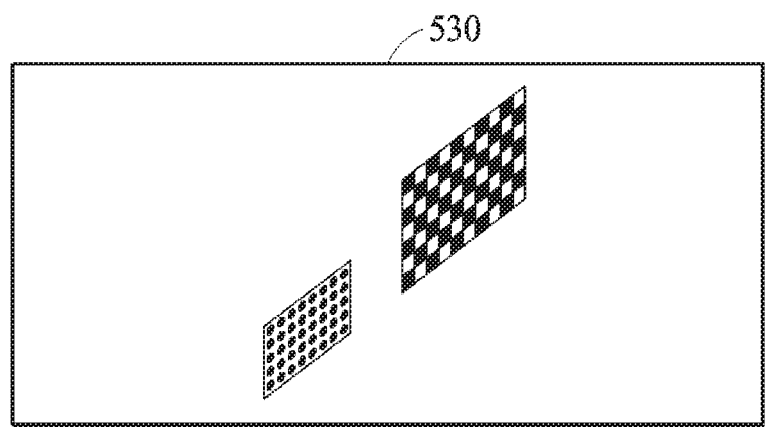

FIG. 8
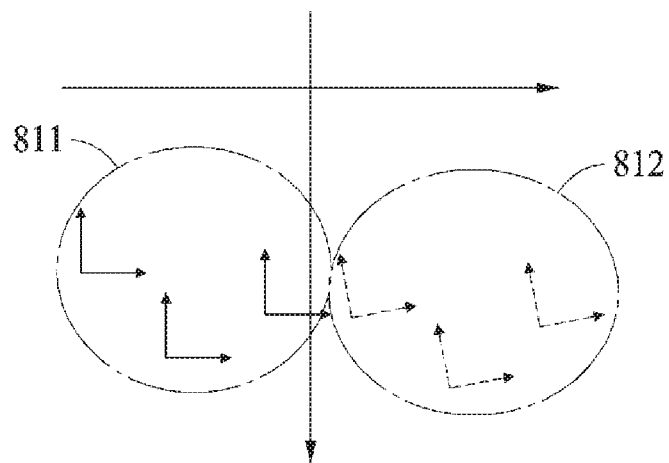
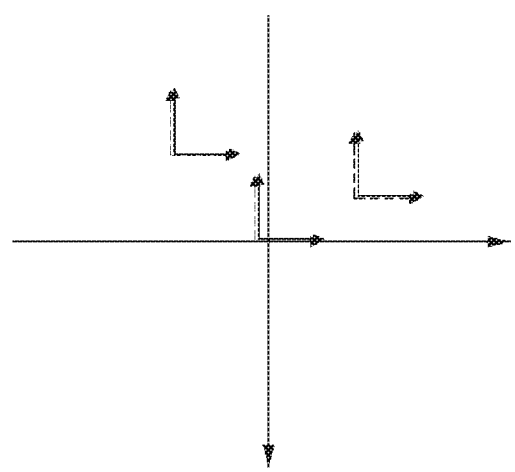

1500

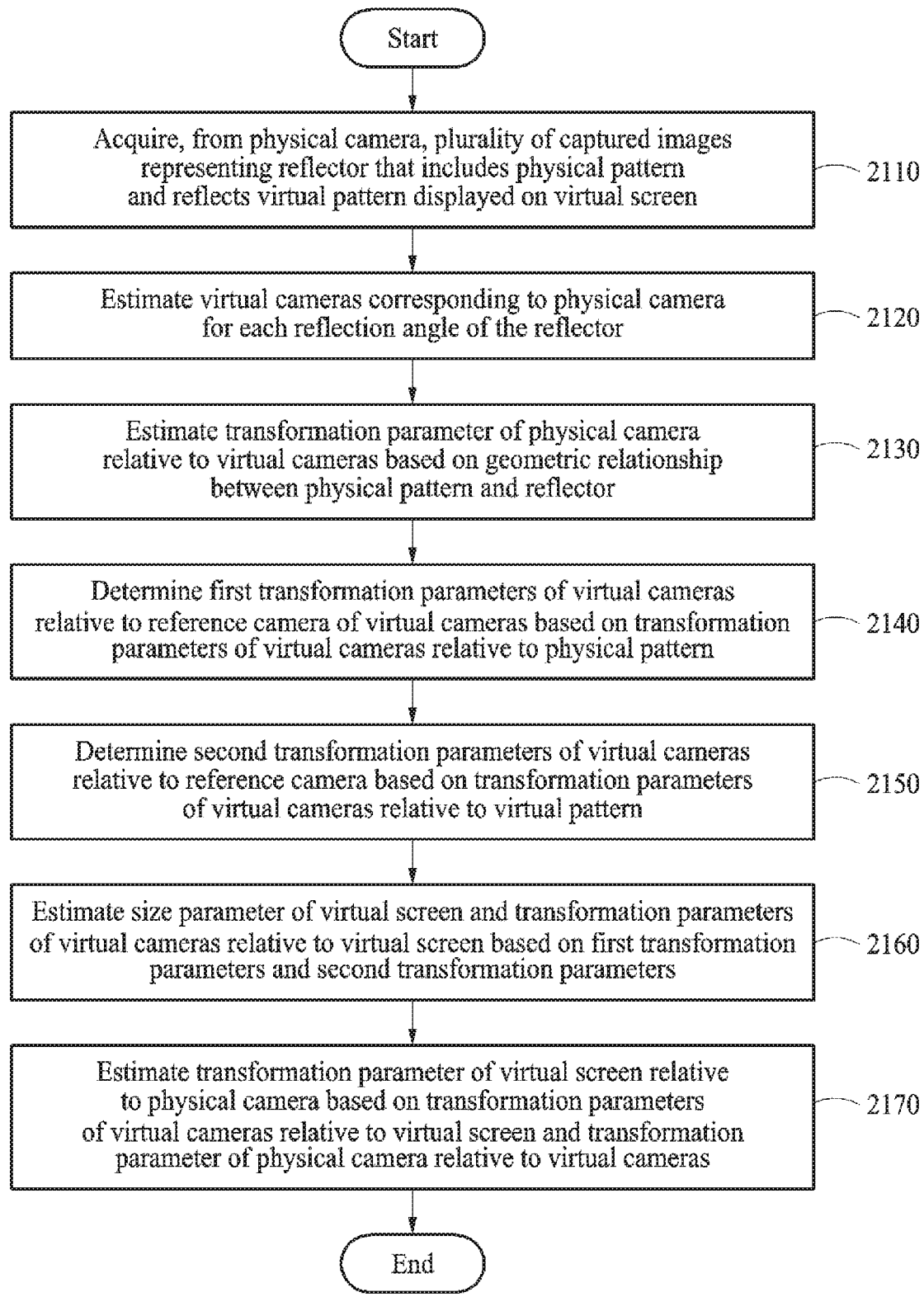

METHOD AND APPARATUS FOR ESTIMATING PARAMETER OF VIRTUAL SCREEN

CROSS-REFERENCE TO RELATED APPLICATION

This application claims priority from Korean Patent Application No. 10-2017-0166725, filed on Dec. 6, 2017 in the Korean Intellectual Property Office, the disclosure of which is incorporated herein by reference in its entirety.

BACKGROUND

1. Field

Methods and apparatuses consistent with exemplary embodiments relate to a method and apparatus for estimating a parameter of a virtual screen.

2. Description of the Related Art

A head-up display (HUD) system may generate a virtual image in front of a driver and display information in conjunction with the display of the virtual image to provide information to the driver. The information provided to the driver may include navigation information and dashboard information such as a vehicle speed, a fuel level, and an engine speed as measured in revolutions per minute (RPM). The driver may easily acquire the displayed information without needing to move a gaze during a driving, and thus a driving stability may be enhanced. In addition to the dashboard information and the navigation information, the HUD system may provide the driver with information on lane marking, construction marking, traffic accident marking, and/or warning signs for pedestrians based on an augmented reality (AR) technique.

SUMMARY

One or more exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a method of estimating a parameter of a virtual screen, the method including acquiring, from a physical camera, a plurality of captured images that represent a reflector reflecting a virtual pattern displayed on a virtual screen and a physical pattern displayed on a physical plane, estimating virtual cameras that correspond to the physical camera for each reflection angle of the reflector, determining first transformation parameters of the virtual cameras relative to a reference camera of the virtual cameras based on transformation parameters of the virtual cameras that relate to the physical pattern, determining second transformation parameters of the virtual cameras relative to the reference camera based on transformation parameters of the virtual cameras that relate to the virtual pattern, and estimating a size parameter of the virtual screen based on the first transformation parameters and the second transformation parameters.

The estimating of the size parameter may include estimating a value that corresponds to a minimum difference between the first transformation parameters and the second transformation parameters to be the size parameter.

The method may further include estimating a third transformation parameter of the virtual screen relative to the physical camera based on the estimated size parameter.

The method may further include estimating a third transformation parameter of the virtual screen relative to the physical camera based on fourth transformation parameters of the virtual cameras relative to the virtual screen and a fifth transformation parameter of the physical camera relative to the virtual cameras.

The method may further include estimating the fifth transformation parameter of the physical camera relative to the virtual cameras based on the plurality of captured images.

The method of may further include estimating the fourth transformation parameters of the virtual cameras relative to the virtual screen based on the first transformation parameters and the second transformation parameters.

According to another aspect of an exemplary embodiment, there is also provided a method of estimating a parameter of a virtual screen, the method including acquiring, from a physical camera, a plurality of captured images that represent a reflector that includes a physical pattern and that reflects a virtual pattern displayed on a virtual screen, estimating virtual cameras that correspond to the physical camera for each reflection angle of the reflector, determining first transformation parameters of the virtual cameras relative to a reference camera of the virtual cameras based on transformation parameters of the virtual cameras that relate to the physical pattern, determining second transformation parameters of the virtual cameras relative to the reference camera based on transformation parameters of the virtual cameras that relate to the virtual pattern, and estimating a size parameter of the virtual screen based on the first transformation parameters and the second transformation parameters.

According to still another aspect of an exemplary embodiment, there is also provided an apparatus for estimating a parameter of a virtual screen, the apparatus including a processor and a memory that includes an instruction to be read by the processor, wherein when the instruction is executed in the processor, the processor is configured to acquire, from a physical camera, a plurality of captured images that represent a reflector reflecting a virtual pattern displayed on a virtual screen and a physical pattern displayed on a physical plane, estimate virtual cameras that correspond to the physical camera for each reflection angle of the reflector, determine first transformation parameters of the virtual cameras relative to a reference camera of the virtual cameras based on transformation parameters of the virtual cameras that relate to the physical pattern, determine second transformation parameters of the virtual cameras relative to the reference camera based on transformation parameters of the virtual cameras that relate to the virtual pattern, and estimate a size parameter of the virtual screen based on the first transformation parameters and the second transformation parameters.

BRIEF DESCRIPTION OF THE DRAWINGS

The above and/or other aspects will be more apparent by describing certain exemplary embodiments with reference to the accompanying drawings, in which:

FIG. 5 is a diagram illustrating a plurality of captured images, according to an exemplary embodiment;

FIG. 8 is a diagram illustrating relative coordinates of a physical pattern and relative coordinates of a virtual pattern, according to an exemplary embodiment;

FIG. 21 is a flowchart illustrating a method of estimating a parameter of a virtual screen, according to an exemplary embodiment.

DETAILED DESCRIPTION

Figure 1:
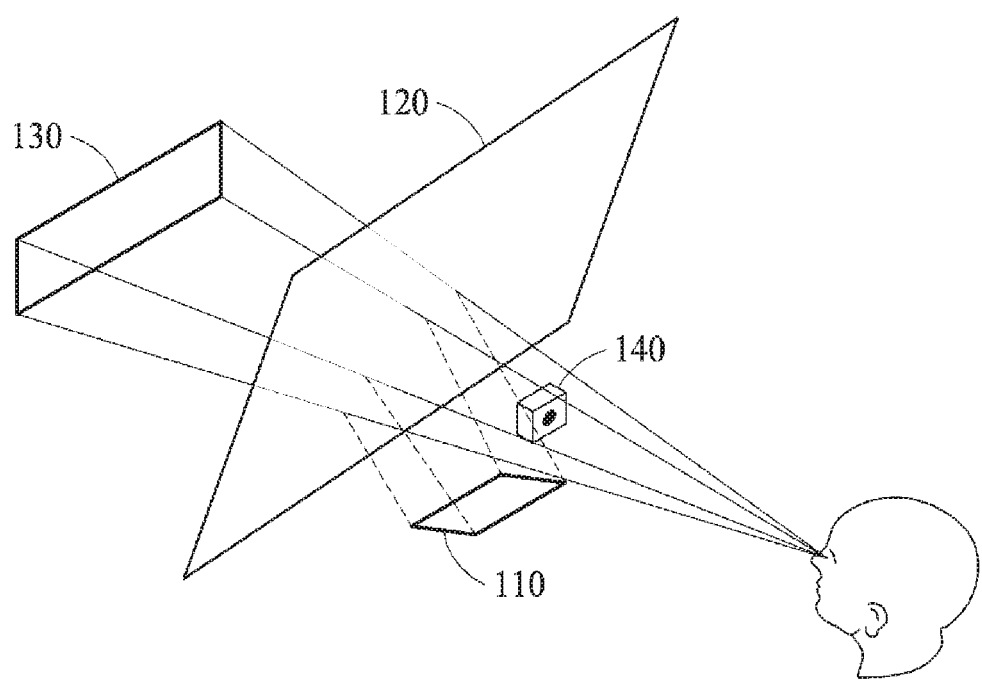
FIG. 1 is a diagram illustrating an augmented reality (AR) system, according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following structural or functional descriptions are exemplary to merely describe the exemplary embodiments, and the scope of the exemplary embodiments is not limited to the descriptions provided in the present specification. Various changes and modifications can be made thereto by persons having ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right, according to the concept of the present disclosure.

As used herein, the singular forms are intended to include the plural forms as well, unless the context clearly indicates otherwise. It should be further understood that the terms "comprises," "includes," "comprising," and/or "including," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

FIG. 1 is a diagram illustrating an augmented reality (AR) system, according to an exemplary embodiment. An AR may be a technology for overlapping a virtual object and a real world to be viewed by a user. The AR technology may be applied to, for example, a head-up display (HUD) and a transmissive head-mounted display (HMD). An AR system 100 may be implemented by, for example, the HUD.

Referring to FIG. 1, the AR system 100 may include an AR optical system 110, a transparent optical element 120, a virtual screen 130, and a viewpoint tracking camera 140. The AR optical system 110 may include a light source, a display panel, and at least one optical element. The display panel and the light source may be used to provide light that corresponds to an AR image. The at least one optical element may reflect the light that corresponds to the AR image toward the transparent optical element 120. For example, a light emitting diode (LED) or a laser may be used as the light source.

The light that corresponds to the AR image may be provided by the AR optical system 110 to form the virtual screen 130. In addition, a portion of the light provided by the AR optical system 110 may be reflected by the transparent optical element 120, which is positioned in front of a user and provided to the user. The transparent optical element 120 may be, for example, a windshield of a vehicle or an aircraft, or a combiner that is provided separate from the windshield and configured to reflect the AR image. The user may simultaneously view light coming from a source in front of the transparent optical element 120 and the portion of the light provided from the AR optical system 110 to be reflected by the transparent optical element 120. In this example, a real object that overlaps a virtual object may be viewed by the user.

The AR system 100 may display the virtual object at a position that corresponds to the real object. For example, information on a vehicle driving direction, lane information, and obstacle information may be displayed at the position that corresponds to the real object on the HUD as the virtual object. Hereinafter, a position at which a virtual object is to be displayed may be referred to as a target position. To accurately display the virtual object at the target position, three-dimensional (3D) background information, a parameter of the virtual screen 130, and user viewpoint information may be required. The AR system 100 may estimate a viewpoint of the user to display the virtual object at an intersection between the virtual screen 130 and a line connecting the viewpoint and the target position.

The 3D background information may be acquired via a 3D sensor (not shown) or a camera (not shown) facing a front of a vehicle. In addition, the viewpoint of the user may be acquired via the viewpoint tracking camera 140 that faces the user. The viewpoint tracking camera 140 may be an image sensor that includes a plurality of pixels and is configured to capture a color image or a gray scale image. A designed value may be used as the parameter of the virtual screen 130. When basic driving information such as a current speed and a time of arrival is to be displayed, matching between the real object and the virtual object may not need to be performed, so that the designed value is used as the parameter of the virtual screen 130. When the designed value is used, there may be a limit to the accuracy of the displaying of the virtual object at the target position because the designed value may be inaccurate. Even when the designed value is accurate, a parameter of the virtual screen 130 may be changed while the AR system 100 is installed or used.

An estimated value of the parameter of the virtual screen 130 may be used instead of the designed value. The parameter of the virtual screen 130 may include a size parameter and a transformation parameter. The size parameter may correspond to a virtual pattern interval of the virtual screen, a pixel interval of the virtual screen, or an overall size of the virtual screen. The transformation parameter may correspond to a pose, an orientation, or relative coordinates. The transformation parameter of the virtual screen 130 may be a transformation parameter of the virtual screen 130 relative to the viewpoint tracking camera 140. By using the transformation parameter of the virtual screen 130, coordinates of the virtual screen 130 may be transformed into coordinates of the viewpoint tracking camera 140.

The AR system 100 may render the AR image by using an estimated parameter of the virtual screen 130 such that the virtual object is accurately displayed at the target position. The parameter of the virtual screen 130 may be estimated in a process of producing the AR system 100, in an installation process of the AR system 100, or in a process of utilizing the AR system 100. For example, since the parameter of the virtual screen 130 may be changed in the process of utilizing the AR system 100, an update may be continuously conducted via a process of estimating the parameter of the virtual screen 130.

Figure 2:
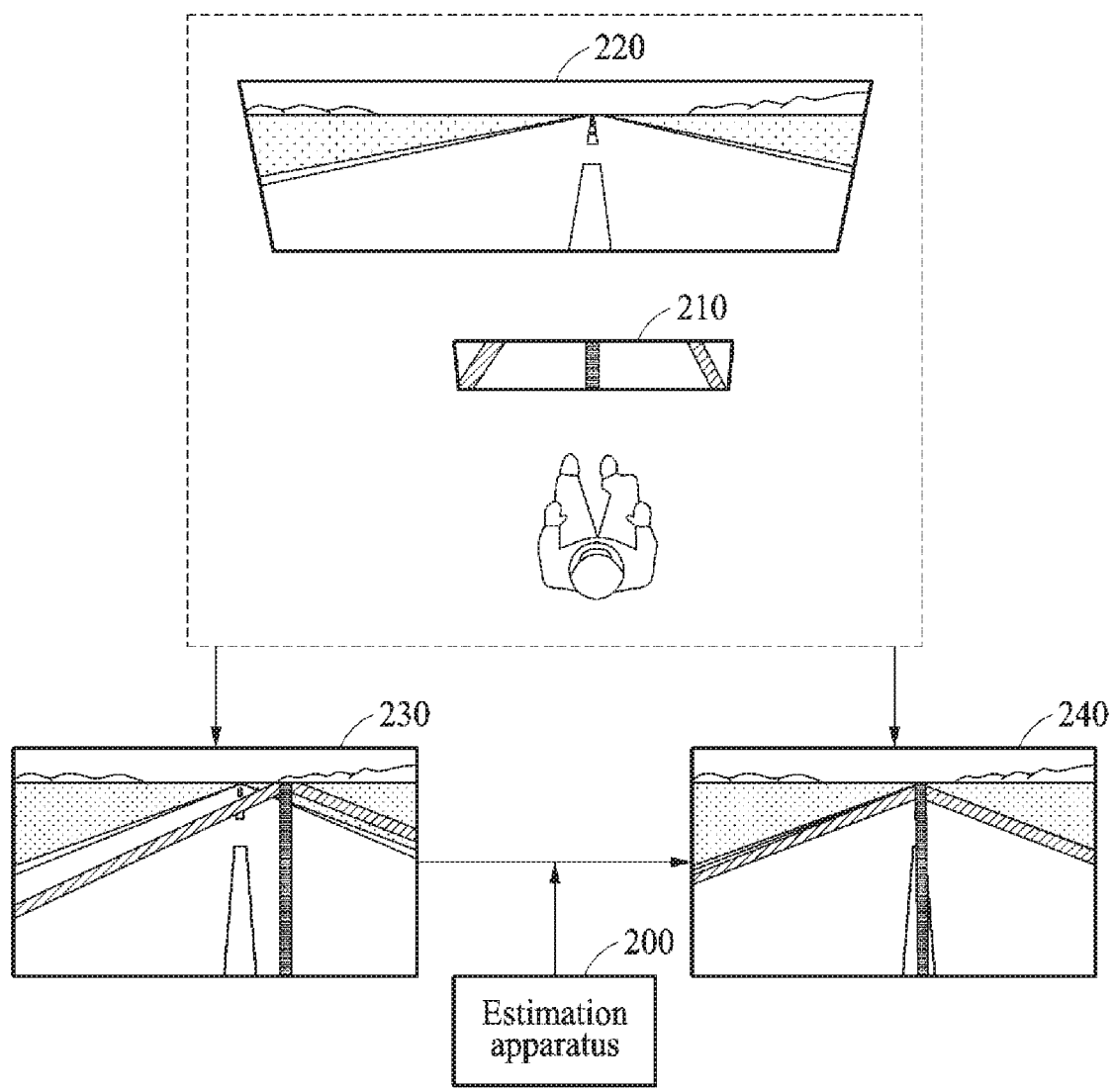
FIG. 2 is a diagram illustrating a calibration result, according to an exemplary embodiment.

FIG. 2 is a diagram illustrating a calibration result, according to an exemplary embodiment. Referring to FIG. 2, a virtual screen 210 and a background 220 may be overlapped to be provided to a user. When a parameter of the virtual screen 210 is inaccurate, a virtual object that is not matched to a real object may be provided to the user as shown in an image 230. An estimation apparatus 200 may estimate the parameter of the virtual screen 210 and provide the estimated parameter of the virtual screen 210 to an AR system. The AR system may render an AR image by using the estimated parameter of the virtual screen 210. In this manner, the virtual object that is matched to the real object may be provided to the user as shown in an image 240.

The estimation apparatus 200 may capture a virtual image of the virtual screen 210 reflected by a reflector by using a viewpoint tracking camera to estimate the parameter of the virtual screen 210. When the virtual screen 210 is directly captured using the viewpoint tracking camera, the parameter of the virtual screen 210 and a position of the viewpoint tracking camera may be unclear so that a measured value is not directly analyzed. The estimation apparatus 200 may additionally capture a known calibration pattern when capturing the virtual screen 210 via the reflector. In this manner, the estimation apparatus 200 may estimate the position of the viewpoint tracking camera from the calibration pattern and estimate the parameter of the virtual screen 210 based on the estimated position of the viewpoint tracking camera.

Figure 3:
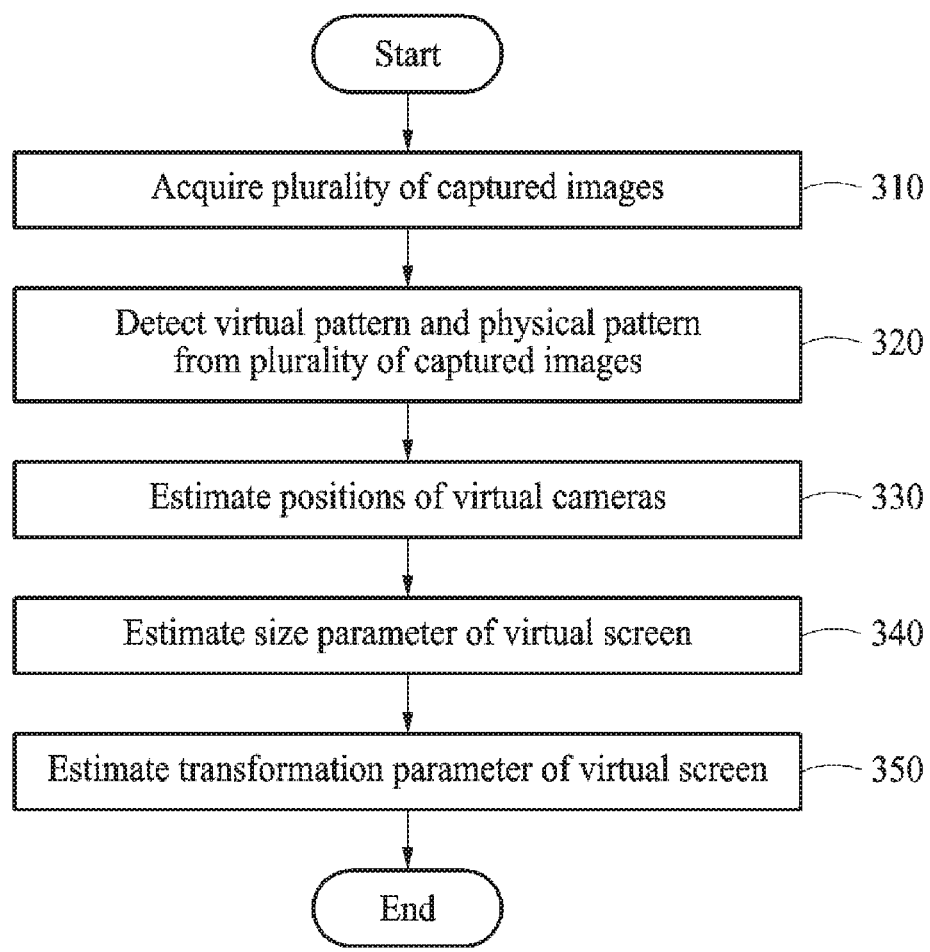
FIG. 3 is a flowchart illustrating a method of estimating a parameter of a virtual screen, according to an exemplary embodiment.

FIG. 3 is a flowchart illustrating a method of estimating a parameter of a virtual screen, according to an exemplary embodiment. Referring to FIG. 3, in operation 310, an estimation apparatus may acquire a plurality of captured images. In operation 320, the estimation apparatus may detect a virtual pattern and a physical pattern from the plurality of captured images. In operation 330, the estimation apparatus may estimate positions of virtual cameras. The plurality of captured images may be acquired by using a viewpoint tracking camera and a reflector. The virtual camera may be a result obtained by reflecting the viewpoint tracking camera to the reflector. In this aspect, in order to distinguish from the virtual camera, the viewpoint tracking camera may also be referred to as a physical camera. The plurality of captured images may be captured by adjusting a reflection angle of the reflector. Thus, a respective one from among a plurality of virtual cameras may be estimated for each reflection angle of the reflector.

In an example, a physical pattern displayed on a physical plane and a virtual pattern displayed on a virtual screen may be used in a parameter estimating process. In this example, the estimation apparatus may be aware of a size parameter of the physical pattern. The estimation apparatus may determine positions of virtual cameras based on the physical pattern for which the size parameter is known and determine a size parameter of the virtual screen such that differences between the determined positions and positions of the virtual cameras estimated based on the virtual pattern are minimized.

Operations 310, 320, and 330 will be further described with reference to FIGS. 4, 5, and 6.

Figure 4:
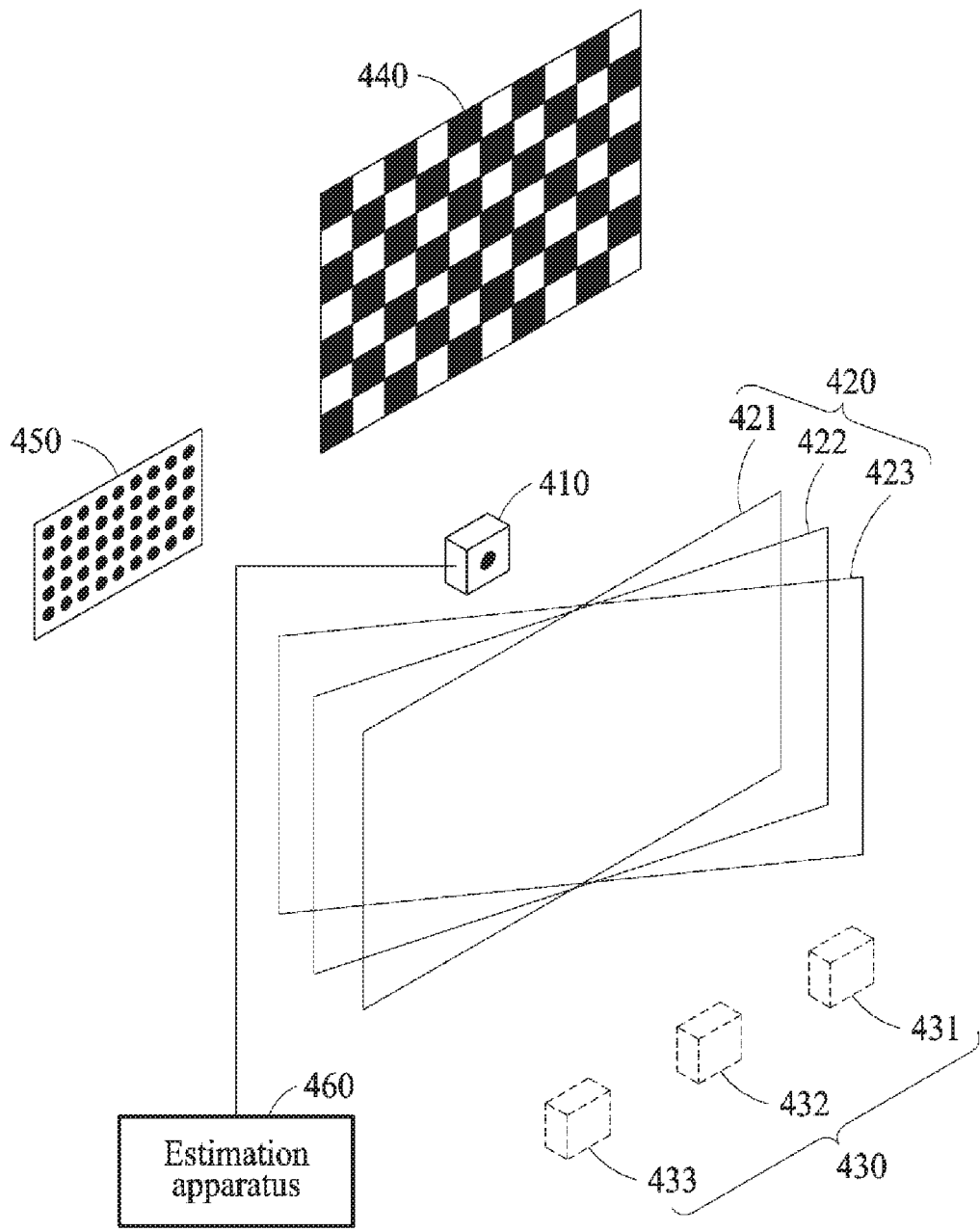
FIG. 4 is a diagram illustrating a system for estimating a parameter of a virtual screen, according to an exemplary embodiment.

FIG. 4 is a diagram illustrating a system for estimating a parameter of a virtual screen, according to an exemplary embodiment. Referring to FIG. 4, an estimation system 400 may include a physical camera 410, a reflector 420, virtual cameras 430, a physical pattern 440, a virtual pattern 450, and an estimation apparatus 460. The physical pattern 440 may be present on a physical plane. The virtual pattern 450 may be present on a virtual screen. The estimation apparatus 460 may be aware of a size parameter of the physical pattern 440. The physical pattern 440 may be a pattern of a first type, and the virtual pattern 450 may be a pattern of a second type that is different from the first type. Although FIG. 4 illustrates that the physical pattern 440 is a chessboard pattern and the virtual pattern 450 is a circular grid pattern, various calibration patterns may also be used as the physical pattern 440 and the virtual pattern 450 in addition to the chessboard pattern and the circular grid pattern.

The reflector 420 may reflect the physical pattern 440 and the virtual pattern 450. The physical camera 410 may capture the reflector 420 reflecting the physical pattern 440 and the virtual pattern 450. Although what is actually captured by the physical camera 410 is a virtual image of the physical pattern 440 and a virtual image of the virtual pattern 450, for ease of description, the virtual image of the physical pattern 440 may also be referred to as the physical pattern 440 and the virtual image of the virtual pattern 450 may also be referred to as the virtual pattern 450. The physical camera 410 may capture the reflector 420 while a reflection angle of the reflector 420 is adjusted. The physical camera 410 may acquire captured images by capturing a reflector 421 at a first angle, a reflector 422 at a second angle, and a reflector 423 at a third angle.

FIG. 5 is a diagram illustrating a plurality of captured images, according to an exemplary embodiment. Referring to FIG. 5, in response to a reflection angle of a reflector being adjusted, a physical pattern and a virtual pattern may be captured at different angles. For example, a captured image 510 may be acquired via the reflector 421 of FIG. 4. Likewise, captured images 520 and 530 may be acquired via the reflectors 422 and 423 of FIG. 4, respectively.

Referring back to FIG. 4, the estimation apparatus 460 may acquire a plurality of captured images by using the physical camera 410. The estimation apparatus 460 may extract the physical pattern 440 and the virtual pattern 450 from each of the captured images. The estimation apparatus 460 may obtain a position of an intersection and a position of a calibration pattern from each of the captured images.

The estimation apparatus 460 may estimate the virtual cameras 430 that correspond to the physical camera 410 for each reflection angle of the reflector 420. The virtual cameras 430 may correspond to virtual images of the physical camera 410 obtained via the reflector 420. A virtual camera 431 may be estimated based on the reflector 421. A virtual camera 432 may be estimated based on the reflector 422. A virtual camera 433 may be estimated based on the reflector 423.

As described above, the estimation apparatus 460 may determine positions of the virtual cameras 430 based on the physical pattern 440 for which a size parameter is known, and determine a size parameter of a virtual screen such that differences between the determined positions and positions of the virtual cameras 430 estimated based on the virtual pattern 450 are minimized. A process of estimating the positions of the virtual cameras 430 will be described below with reference to FIG. 6.

Figure 6:
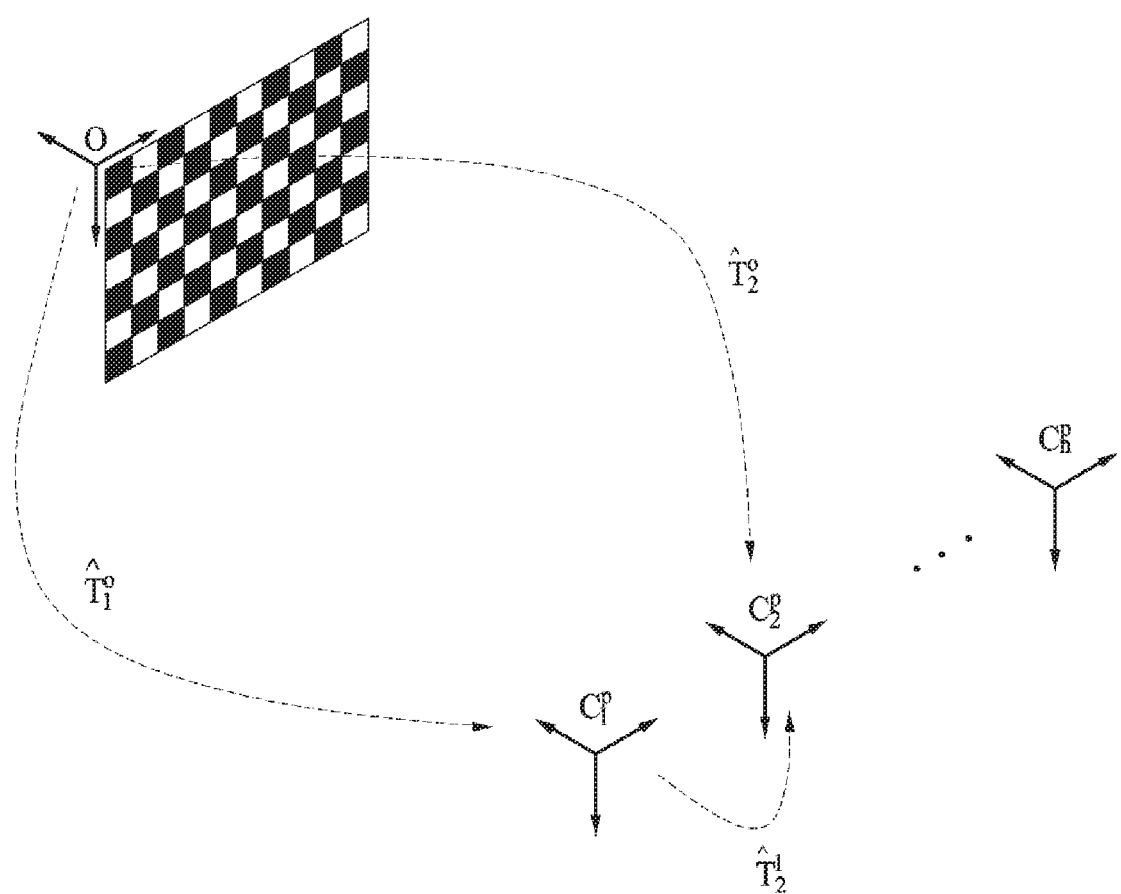
FIG. 6 is a diagram illustrating a process of estimating positions of virtual cameras, according to an exemplary embodiment.

FIG. 6 is a diagram illustrating a process of estimating positions of virtual cameras, according to an exemplary embodiment. An estimation apparatus may extract intersections from a physical pattern in a captured image. An intersection X on a physical pattern in a real world may correspond to coordinates (x, y, 0) on the physical pattern in the captured image. A relationship between the intersection X and a point x obtained by projecting the intersection X onto an image plane that corresponds to the captured image may be expressed as shown in Equation 1.

$$x_{ij} = KU([R_i|t_i]X_{ij}) \quad \text{[Equation 1]}$$

In Equation 1, R denotes a rotation parameter of a pattern, t denotes a translation parameter of the pattern, i denotes an index of a captured image, and j denotes an index of an intersection in the captured image. Also, in Equation 1, K denotes an intrinsic parameter of a camera and U denotes a calibration function. The intrinsic parameter K may be expressed by Equation 2. The calibration function U may be expressed by Equation 3.

$$K = \begin{bmatrix} f_x & 0 & c_x \\ 0 & f_y & c_y \\ 0 & 0 & 1 \end{bmatrix} \quad \text{[Equation 2]}$$

In Equation 2, $f_x$ denotes a focal length of the camera with respect to an x axis and $f_y$ denotes a focal length of the camera with respect to a y axis, and $c_x$ and $c_y$ denote coordinate values of a principal point. $c_x$ and $c_y$ may correspond to an x-axis value and a y-axis value of coordinates on which a principal axis of the camera or a z-axis of coordinates of the camera meets an image plane.

$$U(x, y) = \begin{bmatrix} (1 + k_1 r^2 + k_2 r^4)x + (k_3(2xy) + k_4(r^2 + 2x^2)) \\ (1 + k_1 r^2 + k_2 r^4)y + (k_3(r^2 + 2y^2) + k_4(2xy)) \\ 1 \end{bmatrix} \quad \text{[Equation 3]}$$

A distortion may occur in a camera that uses a lens and thus, the distortion may need to be corrected. In an example, a radial distortion and a tangential distortion may be taken into consideration based on Equation 3. In Equation 3, $k_1$ and $k_2$ denote parameters associated with the radial distortion, and $k_3$ and $k_4$ denote parameters associated with the tangential distortion in Equation 3 where r is $\sqrt{x^2+y^2}$.

Equation 4 may be defined based on Equations 1, 2, and 3.

$$\sum_{i=1}^{n} \sum_{j=1}^{m} \|x_{ij} - P(f_x, f_y, c_x, c_y, k_1, k_2, k_3, k_4, R_i, t_i, X_{ij})\|^2 \quad \text{[Equation 4]}$$

If Equation 4 is referred to as m̃, a camera parameter may be obtained based on an optimization scheme for minimizing m̃. For example, the camera parameter may be obtained by minimizing a difference between the point x on a captured image and a point obtained by projecting real coordinates X on the captured image by using a function P. In Equation 4, n denotes a number of captured images and m denotes a number of intersections in a captured image.

A rotation parameter R and a translation parameter t associated with intersections in each captured image may be obtained by using Equation 4. The rotation parameter R and the translation parameter t may represent a pose of the physical pattern relative to the physical camera. A transformation parameter T may be represented on homogeneous coordinates based on the rotation parameter R and the translation parameter t as shown in Equation 5.

$$T_i = \begin{bmatrix} R_i & t_i \\ 0 & 1 \end{bmatrix} \quad \text{[Equation 5]}$$

Since the physical pattern is in a fixed position and the virtual camera moves, transformation parameters $\hat{T}_i$ of the virtual cameras relative to the physical pattern may be expressed as shown in Equation 6.

$$\hat{T}_i = T_i^{-1} \quad \text{[Equation 6]}$$

In Equation 6, l (i.e., a lowercase letter L) denotes an index of a virtual camera and has a value ranging from 1 to n. In FIG. 6, $\widehat{T_1^o}$ denotes a transformation parameter of a first virtual camera relative to a physical pattern, $\widetilde{T_2^O}$ denotes a transformation parameter of a second virtual camera relative to a physical pattern, O denotes reference coordinates of the physical pattern, and $C_1^P$ through $C_n^P$ denote relative coordinates of the first virtual camera through an $n^{th}$ virtual camera relative to the reference coordinates O. Among the first virtual camera through the $n^{th}$ virtual camera, a reference camera may be determined. A transformation parameter of a virtual camera relative to the reference camera may be expressed as shown in Equation 7.

$$T_n^1 = T_1 \hat{T}_n \quad \text{[Equation 7]}$$

For example, the first virtual camera, which corresponds to the relative coordinates $C_1^P$, may be set to be the reference camera. In this example, $\widetilde{T_2^1}$ of FIG. 6 denotes a transformation parameter of the second virtual camera relative to the first virtual camera.

Transformation parameters of virtual cameras relative to a virtual pattern may be determined via a process similar to that described with reference to FIG. 6. In this manner, a transformation parameter of a virtual camera relative to a reference camera may be determined. Hereinafter, a transformation parameter of a virtual camera relative to a reference camera determined based on a physical pattern may also be referred to as a first transformation parameter, and a transformation parameter of a virtual camera relative to a reference camera determined based on a virtual pattern may also be referred to as a second transformation parameter.

The estimation apparatus may extract intersections from a virtual pattern in a captured image. An accurate value of an intersection on a virtual pattern of a virtual screen may be unknown until a size parameter of the virtual screen is known. When a spacing of the virtual pattern is d, a horizontal length of the virtual pattern is w, a vertical length of the virtual pattern is h, a start position of the virtual pattern is $(b_x, b_y)$, and a pixel size of the virtual pattern is e, the intersection Y may be defined as shown in Equation 8.

$$Y_{ij} = \begin{bmatrix} e(b_x + dW(Y_{ij})) \\ e(b_y + dH(Y_{ij})) \\ 0 \end{bmatrix} \quad \text{[Equation 8]}$$

In Equation 8, i denotes an index of a captured image, j denotes an index of an intersection, W denotes an $x^{th}$ ordinal position of $Y_{ij}$, and H denotes a $y^{th}$ ordinal position of $Y_{ij}$. W and H may be defined as shown in Equations 9 and 10. In Equation 8, values other than e may be defined in advance.

$$W(Y_{ij}) = \mod(j, w) \quad \text{[Equation 9]}$$

$$H(Y_{ij}) = [j/h] \quad \text{[Equation 10]}$$

A perspective-n-point (PnP) method may be used to estimate a pose of the virtual pattern relative to the virtual camera. Poses of the virtual pattern relative to the virtual cameras may be defined as $R'_i$ and $t'_i$, i being an index of a captured image or a virtual pattern that appears in the captured image. The poses may correspond to coordinates of the virtual pattern and thus, may be transformed into poses of the virtual cameras relative to the virtual pattern as shown in Equation 11.

$$\widehat{R'}_i = R'^{-1}_i, \widehat{t'}_i = t'^{-1}_i \quad \text{[Equation 11]}$$

In Equation 11, l denotes an index of a virtual camera. As described above with reference to Equation 5, a transformation parameter on homogeneous coordinates may be expressed as shown in Equation 12.

$$T'_i = \begin{bmatrix} R'_i & t'_i \\ 0 & 1 \end{bmatrix} \quad \text{[Equation 12]}$$

Further, as described above with reference to Equation 7, a reference camera may be determined from the virtual cameras and a transformation parameter of the virtual camera relative to the reference camera may be expressed as shown in Equation 13.

$$T'^1_n = T'_1 \widehat{T'}_n \quad \text{[Equation 13]}$$

Transformation parameters $\hat{T}$ of the virtual cameras relative to the physical pattern and first transformation parameters $T_n^1$ of the virtual cameras relative to the reference camera may be determined by using Equations 6 and 7. Transformation parameters $\widehat{T'}$ of the virtual cameras relative to the virtual pattern and second transformation parameters $T'^1_n$ of the virtual cameras relative to the reference camera may be determined by using Equations 12 and 13. The estimation apparatus may determine the first transformation parameters $T_n^1$ based on the transformation parameters $\hat{T}$ and determine the second transformation parameters $T'^1_n$ based on the transformation parameters $\widehat{T'}$.

Referring back to FIG. 3, the estimation apparatus may estimate a size parameter of the virtual screen in operation 340. The estimation apparatus may estimate the size parameter of the virtual screen based on the first transformation parameters and the second transformation parameters. For example, the estimation apparatus may determine relative coordinates of the first transformation parameters and relative coordinates of the second transformation parameters. The relative coordinates of the second transformation parameters may vary based on the size parameter of the virtual screen. Since a position of the virtual camera using the physical pattern is the same as a position of the virtual camera using the virtual pattern, the size parameter of the virtual screen may be estimated therefrom.

The estimation apparatus may determine a value that minimizes a difference between each respective one of the first transformation parameters and each corresponding one of the second transformation parameters to be the size parameter, which may be expressed as shown in Equation 14 below.

$$\min_e \sum_{i=1}^n \|T_i^1 - T'^1_i\|^2 \quad \text{[Equation 14]}$$

In Equation 14, $T_i^1$ denotes a first transformation parameter, $T'^1_i$ denotes a second transformation parameter, n denotes a number of captured images, and e denotes a size parameter. The estimation apparatus may estimate the size parameter by using Equation 14. In response to the size parameter of the virtual screen being estimated, a pose of the virtual screen relative to the virtual cameras may also be estimated.

Operation 340 will be further described below with reference to FIGS. 7, 8, 9, and 10.

Figure 7:
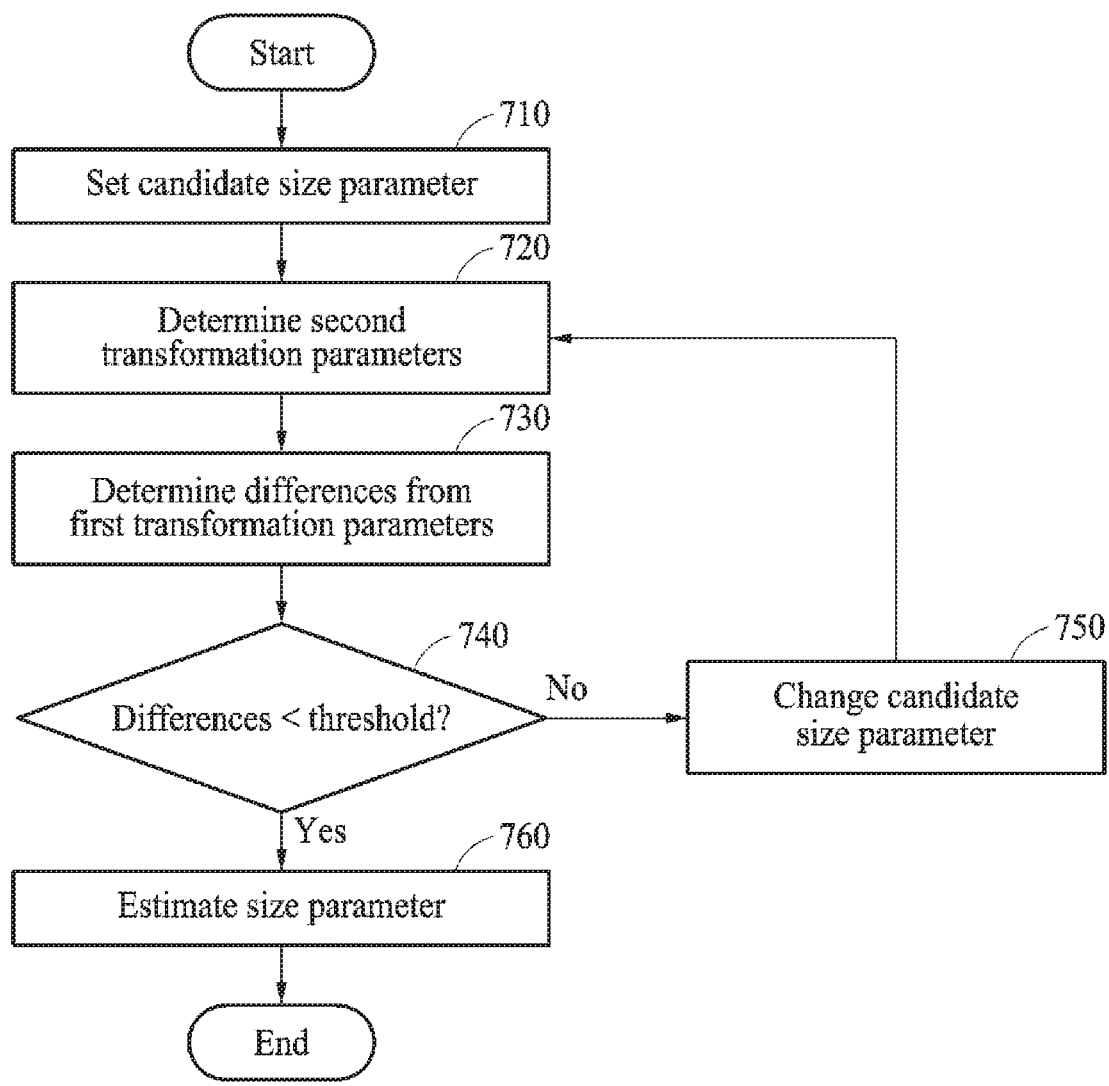
FIG. 7 is a flowchart illustrating a method of estimating a size parameter of a virtual screen by using transformation parameters, according to an exemplary embodiment.

FIG. 7 is a flowchart illustrating a method of estimating a size parameter of a virtual screen by using transformation parameters, according to an exemplary embodiment. Referring to FIG. 7, in operation 710, an estimation apparatus may set a candidate size parameter. The candidate size parameter may be set to be a predetermined value. In operation 720, the estimation apparatus may determine second transformation parameters based on the candidate size parameter. In operation 730, the estimation apparatus may determine differences between respective first transformation parameters and corresponding ones of the second transformation parameters as determined based on the candidate size parameter. In operation 740, the estimation apparatus may compare each of the determined differences to a threshold. The threshold may be set in advance. The estimation apparatus may estimate the candidate size parameter to be a size parameter based on a comparison result of operation 740. When the determined differences are greater than the threshold, the estimation apparatus may change the candidate size parameter in operation 750 and then perform operation 720 again. When the determined differences are less than the threshold, the estimation apparatus may estimate the candidate size parameter to be the size parameter in operation 760.

FIG. 8 is a diagram illustrating relative coordinates of a physical pattern and relative coordinates of a virtual pattern, according to an exemplary embodiment. A first transformation parameter may be represented by relative coordinates 811 of a physical pattern. A second transformation parameter may be represented by relative coordinates 812 of a virtual pattern. Distributions of the relative coordinates 811 of the physical pattern and the relative coordinates 812 of the virtual pattern may vary based on whether a size parameter is calibrated. A position of a virtual camera based on the physical pattern may be the same as a position of a virtual camera based on the virtual pattern. When the size parameter is calibrated, the relative coordinates 811 of the physical pattern and the relative coordinates 812 of the virtual pattern may indicate positions that correspond to each other. A distribution 810 may be obtained when the size parameter is not calibrated. A distribution 820 may be obtained when the size parameter is calibrated.

Figure 9:
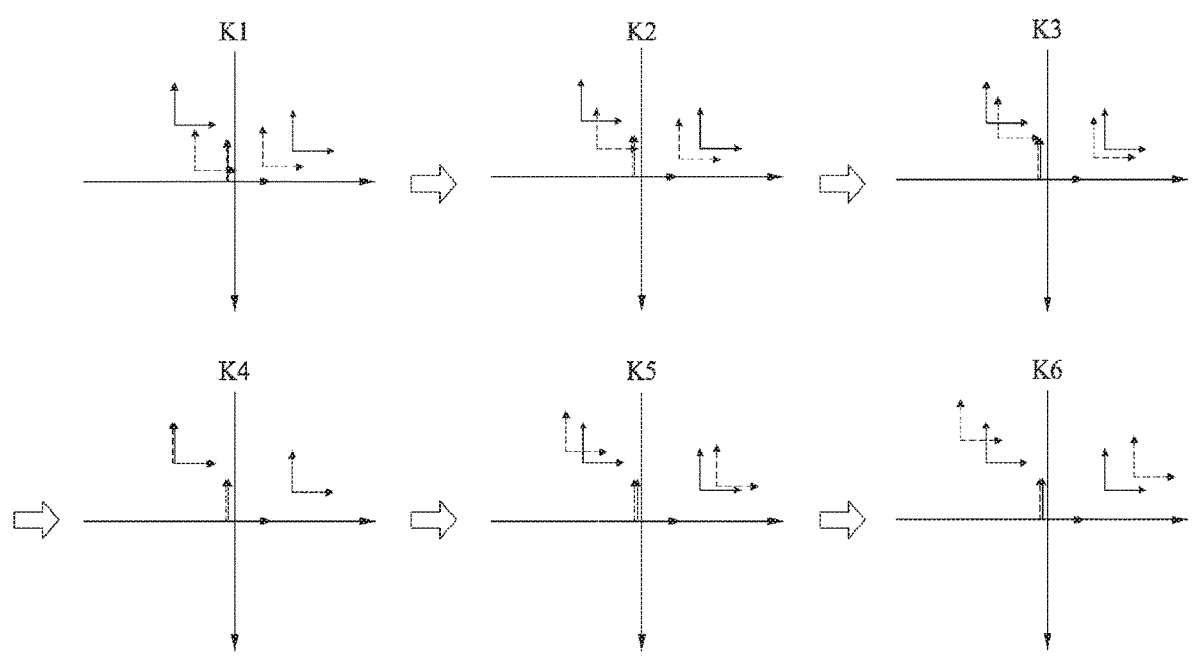
FIG. 9 is a diagram illustrating relative coordinates for each size parameter, according to an exemplary embodiment.
Figure 10:
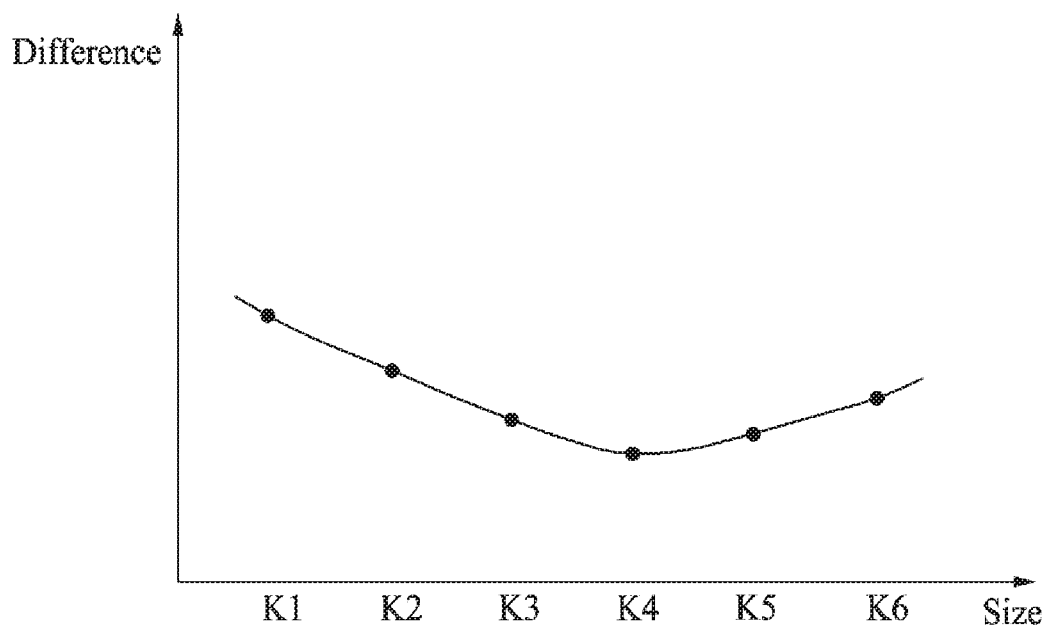
FIG. 10 is a graph illustrating a difference between relative coordinates of size parameters, according to an exemplary embodiment.

FIG. 9 is a diagram illustrating relative coordinates for each size parameter, according to an exemplary embodiment, and FIG. 10 is a graph illustrating a difference between relative coordinates of size parameters, according to an exemplary embodiment.

FIG. 9 illustrates relative coordinates of a physical pattern and relative coordinates of a virtual pattern obtained when a virtual screen has size parameters of K1, K2, K3, K4, K5, and K6. In FIG. 9, the relative coordinates of the physical pattern are indicated on solid lines and the relative coordinates of the virtual pattern are indicated on dashed lines. Since a size parameter of the physical pattern is known, the relative coordinates of the physical pattern may be fixed. In addition, positions of the relative coordinates of the virtual pattern may be changed in response to a change in a size parameter of the virtual screen. For example, in response to a change in a size parameter of the virtual screen, the positions of the relative coordinates of the virtual pattern may approach the relative coordinates of the physical pattern and then, separate farther from the relative coordinates of the physical pattern.

In the graph of FIG. 10, an x-axis represents a size parameter of a virtual screen and a y-axis represents a difference between relative coordinates of a physical pattern and relative coordinates of a virtual pattern. The estimation apparatus may calculate a first value that represents the relative coordinates of a physical pattern and a second value that represents the relative coordinates of the virtual pattern. The estimation apparatus may determine a difference between the first value and the second value to be the difference between a respective one of the relative coordinates of the physical pattern and a corresponding one of the relative coordinates of the virtual pattern. For example, a representative value of relative coordinates may be calculated to be an average value of reference coordinates of the relative coordinates.

Referring to FIG. 10, a difference value of the relative coordinates of the physical pattern and the relative coordinates of the virtual pattern may be minimized when a size parameter of a virtual screen is K4. In the example of FIG. 9, when the size parameter of the virtual screen is K4, the relative coordinates of the physical pattern and the relative coordinates of the virtual pattern may be at corresponding positions and thus, the differences between the relative coordinates of the physical pattern and the relative coordinates of the virtual pattern may be minimized. The estimation apparatus may estimate a candidate size parameter that minimizes the difference value to be the size parameter while adjusting the candidate size parameter. Further, the estimation apparatus may estimate a candidate size parameter that reduces the difference value to be less than a threshold to be the size parameter.

Referring back to FIG. 3, in operation 350, the estimation apparatus may estimate a transformation parameter of the virtual screen. In the following description, a transformation parameter of the virtual screen may be, for example, a transformation parameter of the virtual screen relative to a physical camera. The transformation parameter of the virtual screen may correspond to a pose, an orientation, or relative coordinates.

In an example, the estimation apparatus may estimate the transformation parameter of the virtual screen based on the size parameter estimated in operation 340. When calibration of the size parameter is completed, the virtual pattern may function identically to the physical pattern and thus, the transformation parameter of the virtual screen may be estimated based on the virtual pattern. The estimation apparatus may estimate geometric relationships between patterns and reflectors based on captured images and calculate a projection error between the patterns and virtual images of the patterns in the captured images based on the estimated geometric relationships. The estimation apparatus may estimate the transformation parameter of the virtual screen relative to the physical camera such that the projection error is minimized. In this aspect, the pattern may be, for example, a physical pattern or a virtual pattern. The present example will be further described below with reference to FIGS. 11, 12, and 13.

In another example, the estimation apparatus may estimate a transformation parameter of the virtual screen relative to the physical camera based on transformation relationships of the physical camera, virtual cameras, and the virtual screen. When the estimation apparatus is aware of a transformation parameter of the physical camera relative to the virtual cameras and transformation parameters of the virtual cameras relative to the virtual screen, the estimation apparatus may estimate the transformation parameter of the virtual screen relative to the physical camera based on these transformation parameters.

When the size parameter of the virtual screen is estimated in operation 340 of FIG. 3, a pose of the virtual screen relative to the virtual cameras may also be estimated. The estimation apparatus may estimate a transformation parameter of the virtual screen relative to the virtual cameras based on the first transformation parameters and the second transformation parameters in operation 340 of FIG. 3. Further, the estimation apparatus may estimate a transformation parameter of the physical camera relative to the virtual cameras based on a geometric relationship between the physical pattern and a reflector, or estimate a transformation parameter of the physical camera relative to the virtual cameras by using a reflector that includes the physical pattern. The present example will be further described below with reference to FIG. 14.

Figure 11:
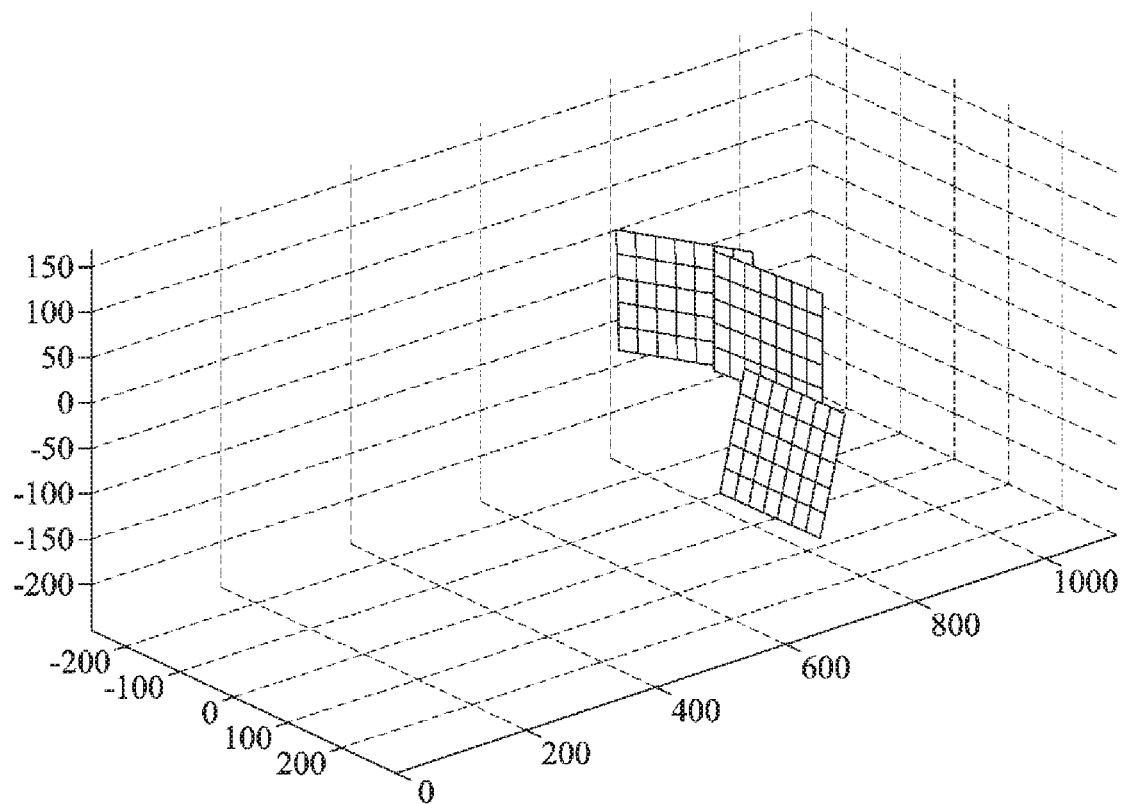
FIG. 11 is a diagram illustrating virtual images generated by a reflector, according to an exemplary embodiment.

FIG. 11 is a diagram illustrating virtual images generated by a reflector, according to an exemplary embodiment. An estimation apparatus may estimate positions of virtual images based on captured images. The virtual images may be obtained by reflecting a physical pattern to a reflector or by reflecting a virtual pattern to the reflector. A number of virtual images may correspond to a number of captured images.

Figure 12:
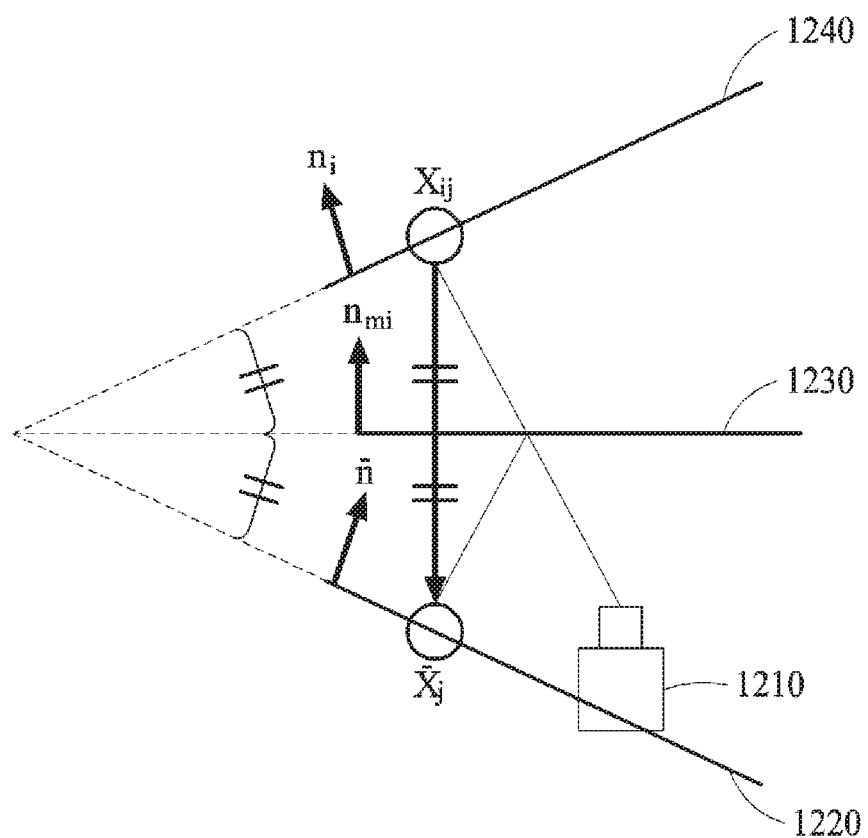
FIG. 12 is a diagram illustrating a geometric relationship of a pattern, a reflector, and a virtual image, according to an exemplary embodiment.

FIG. 12 is a diagram illustrating a geometric relationship of a pattern, a reflector, and a virtual image, according to an exemplary embodiment. FIG. 12 illustrates a geometric relationship of an estimated pattern 1220, a reflector 1230, and a virtual image 1240. The pattern 1220 may be, for example, a physical pattern or a virtual pattern. An estimation apparatus may project a feature point of the pattern 1220 on the virtual image 1240 based on a candidate transformation parameter of a virtual screen. As the candidate transformation parameter of the virtual screen converges to true, a distance between the projected feature point and a corresponding point of the virtual image 1240 may decrease. The estimation apparatus may verify whether the distance between the feature point and the corresponding point decreases while adjusting the candidate transformation parameter.

The estimation apparatus may be aware of a pose between a physical camera 1210 and the virtual image 1240 based on an extrinsic parameter of the physical camera 1210. The estimation apparatus may determine positions of the physical camera 1210 and the virtual image 1240. The position of the pattern 1220 may be determined based on an initial value of the candidate transformation parameter. The position of the reflector 1230 may be determined in a middle between the pattern 1220 and the virtual image 1240. An angle between the reflector 1230 and the pattern 1220 may be the same as an angle between the reflector 1230 and the virtual image 1240. In this manner, the geometric relationship of the pattern 1220, the reflector 1230, and the virtual image 1240 may be estimated.

The estimation apparatus may calculate a projection error between the pattern 1220 and the virtual image 1240 based on the geometric relationship of the pattern 1220, the reflector 1230, and the virtual image 1240. A normal vector $n_{mi}$ obtained via normalization of the pattern 1220 may be expressed as shown in Equation 15.

$$n_{mi} = \frac{\bar{n} + n_i}{\|\bar{n} + n_i\|}$$ [Equation 15]

In Equation 15, $\bar{n}$ denotes a normal vector of the pattern 1220 and $n_i$ denotes a normal vector of the virtual image 1240. When a feature point $\bar{X}_j$ of the pattern 1220 is moved toward the normal vector $n_{mi}$ in a normal direction of the reflector 1230 by a distance $d_{ij}$, the feature point $\bar{X}_j$ may be projected on a position of $X_{ij}$. $d_{ij}$ may be expressed as shown in Equation 16.

$$d_{ij} = \|\bar{X}_j - X_{ij}\|$$ [Equation 16]

Further, a projection of the aforementioned feature point may be expressed as shown in Equation 17.

$$T_{ij}(\bar{X}_j) = \bar{X}_j + d_{ij} n_{mi}$$ [Equation 17]

A projection error may be a Euclidean distance from a feature point $X_{ij}$ of an $i^{th}$ virtual image, for example, the virtual image 1240 that corresponds to $t_{ij}(\bar{X}_j)$ onto which the feature point $\bar{X}_j$ of the pattern 1220 is projected. An average error $E_m$ obtained by projecting the feature point $\bar{X}_j$ to all virtual images may be expressed as shown in Equation 18.

$$E_m = \frac{1}{MN} \sum_{i=1}^{N} \sum_{j=1}^{M} \|X_{ij} - T_{ij}(\bar{X}_j)\|$$ [Equation 18]

The estimation apparatus may determine a candidate transformation parameter that minimizes $E_m$ to be a transformation parameter. For example, when a value of $E_m$ which is obtained based on a value changed from an initial value of the candidate transformation parameter is less than a value of $E_m$ which is obtained based on the initial value, the candidate transformation parameter may be updated with a different value. The estimation apparatus may obtain a final transformation parameter by repetitively performing this process until the candidate transformation parameter remains unchanged.

Figure 13:
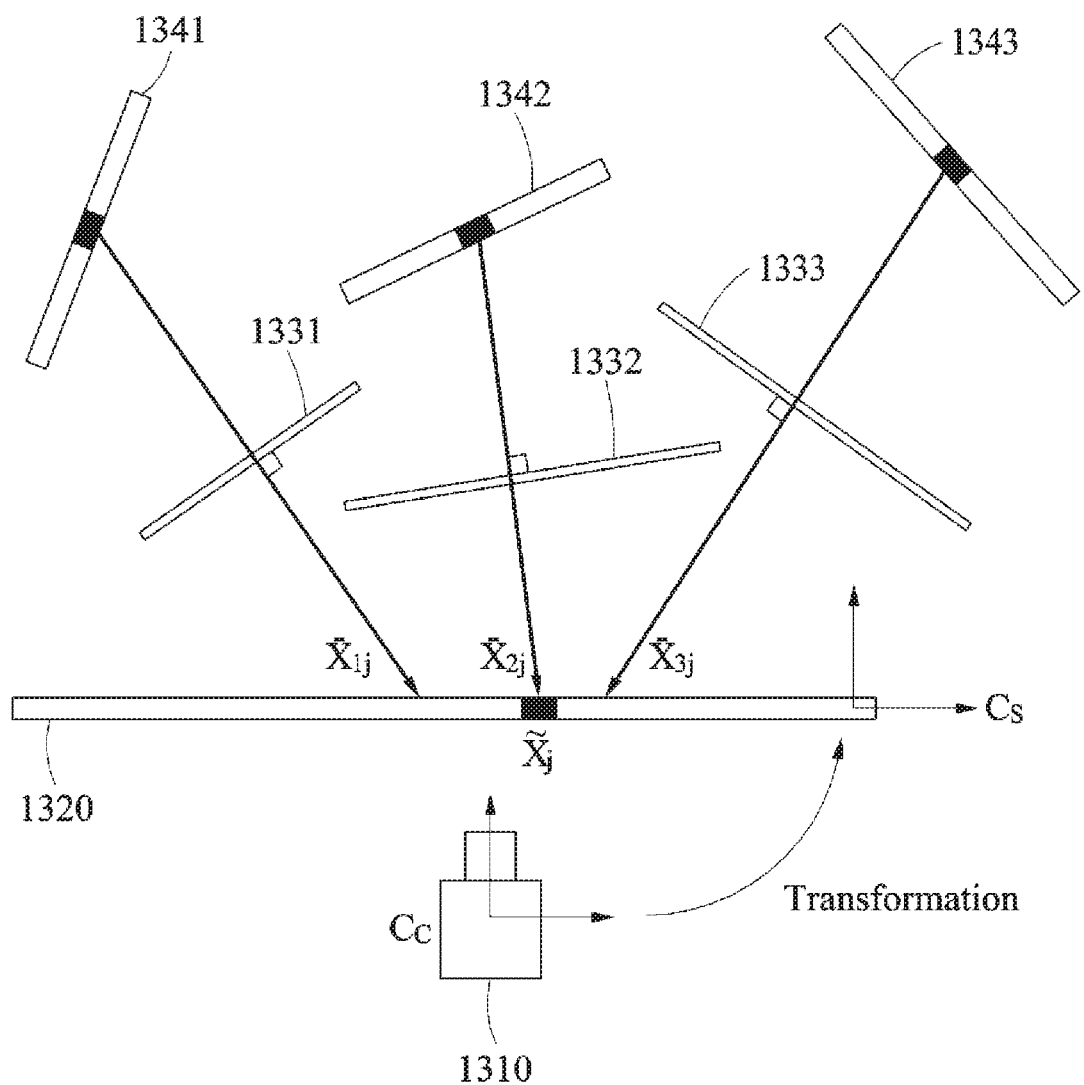
FIG. 13 is a diagram illustrating a process of estimating a transformation parameter of a virtual screen relative to a physical camera by using a pattern, according to an exemplary embodiment.

FIG. 13 is a diagram illustrating a process of estimating a transformation parameter of a virtual screen relative to a physical camera by using a pattern, according to an exemplary embodiment. Referring to FIG. 13, a candidate transformation parameter having minimum differences between $\tilde{X}_j$ and $\overline{X_{1j}}$, $\overline{X_{2j}}$, and $\overline{X_{3j}}$ obstaned based on a pattern 1320, reflectors 1331, 1332, and 1333, and virtual images 1341, 1342, and 1343 may be determined to be a transformation parameter.

When the pattern 1320 is a virtual pattern, the determined transformation parameter may be a transformation parameter of a virtual screen relative to a physical camera 1310. When the pattern 1320 is a physical pattern, the determined transformation parameter may be a transformation parameter of a physical plane relative to the physical camera 1310. An estimation apparatus may estimate a transformation parameter of the physical camera 1310 relative to virtual cameras by using the transformation parameter of the physical plane relative to the physical camera 1310. The estimation apparatus may estimate the transformation parameter of the virtual screen relative to the physical camera 1310 based on the transformation parameter of the physical camera 1310 relative to the virtual cameras and a transformation parameter of the virtual cameras relative to the virtual screen.

Figure 14:
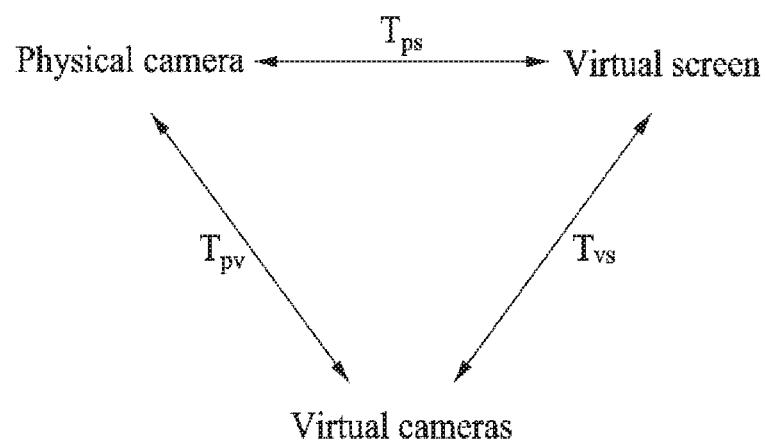
FIG. 14 is a diagram illustrating a conversion relationship of a physical camera, a virtual screen, and virtual cameras, according to an exemplary embodiment.

FIG. 14 is a diagram illustrating a conversion relationship of a physical camera, a virtual screen, and virtual cameras, according to an exemplary embodiment. Referring to FIG. 14, an estimation apparatus may estimate a transformation parameter $T_{ps}$ of a virtual screen relative to a physical camera based on a transformation parameter $T_{pv}$ of the physical camera relative to virtual cameras and a transformation parameter $T_{vs}$ of the virtual cameras relative to the virtual screen.

In an example, as described above with reference to FIGS. 11, 12, and 13, the estimation apparatus may estimate a transformation parameter of the physical camera relative to the virtual cameras based on a geometric relationship between a physical pattern and a reflector. Further, in operation 340 of FIG. 3, the estimation apparatus may estimate a transformation parameter of the virtual screen relative to the virtual cameras based on the first transformation parameters and the second transformation parameters.

In another example, the estimation apparatus may estimate a transformation parameter of the physical camera relative to the virtual cameras by using a reflector that includes a physical pattern. In addition, in operation 340 of FIG. 3, the estimation apparatus may estimate a transformation parameter of the virtual screen relative to the virtual cameras based on the first transformation parameters and the second transformation parameters.

Figure 15:
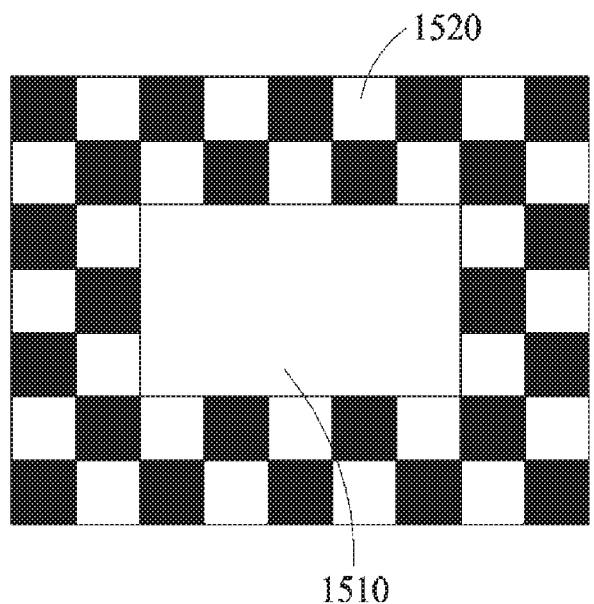
FIG. 15 is a diagram illustrating a reflector including a physical pattern, according to an exemplary embodiment.

FIG. 15 is a diagram illustrating a reflector that includes a physical pattern, according to an exemplary embodiment. Referring to FIG. 15, a reflector 1500 may include a reflection area 1510 and a physical pattern 1520. The reflector 1500 may reflect a virtual pattern by using the reflection area 1510. An estimation apparatus may be aware of a size parameter of the physical pattern 1520. The estimation apparatus may estimate a transformation parameter of the reflector 1500 relative to a physical camera based on the physical pattern 1520. Further, the estimation apparatus may estimate a geometric relationship between the reflector 1500 and the physical camera and a geometric relationship between the reflector 1500 and a virtual camera based on the transformation parameter of the reflector 1500 relative to the physical camera. The estimation apparatus may estimate a transformation parameter of the physical camera relative to virtual cameras based on the geometric relationship between the reflector 1500 and the physical camera and the geometric relationship between the reflector 1500 and the virtual camera.

Figure 16:
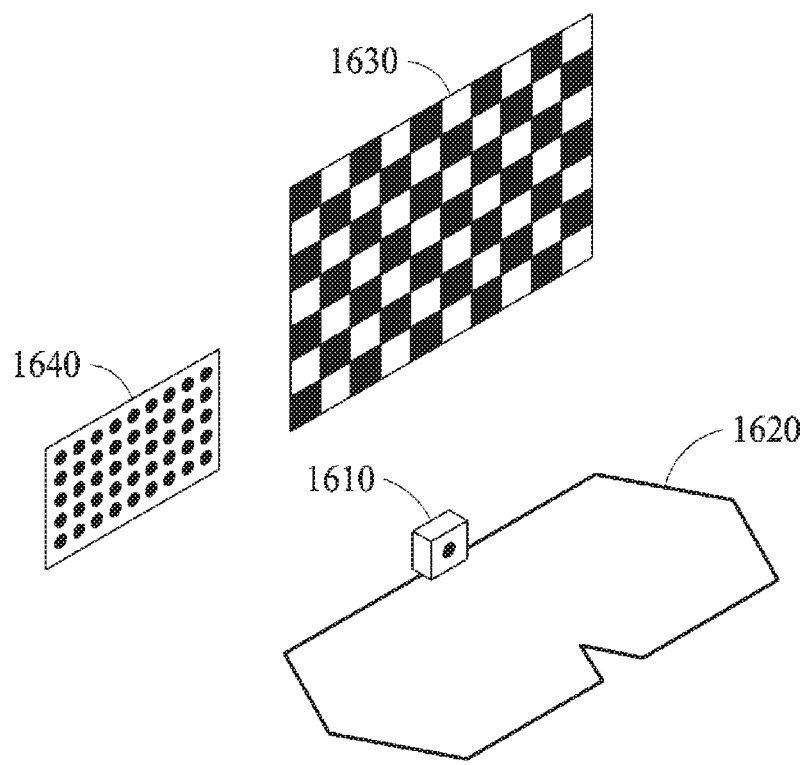
FIG. 16 is a diagram illustrating an estimation system that uses a head-mounted display, according to an exemplary embodiment.

FIG. 16 is a diagram illustrating an estimation system that uses a head-mounted display, according to an exemplary embodiment. A head-mounted display 1620 may be a device such as smart glasses that is attachable to a head of a user so as to provide an AR environment. The head-mounted display 1620 may overlap a real object with a virtual object and display the overlapped real object in front of the user. An estimation apparatus may estimate a transformation parameter of a virtual screen relative to a physical camera 1610 by using a physical pattern 1630 and a virtual pattern 1640. The description of FIGS. 1 through 15 and 17 through 21 may also be applied to an operation of the estimation apparatus.

Figure 17:
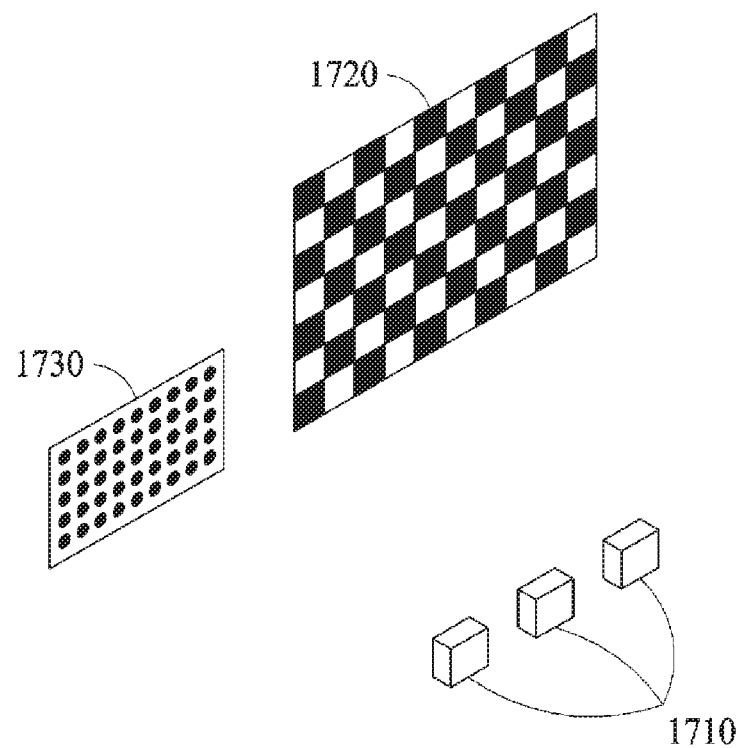
FIG. 17 is a diagram illustrating an estimation system that uses a plurality of physical cameras, according to an exemplary embodiment.

FIG. 17 is a diagram illustrating an estimation system that uses a plurality of physical cameras, according to an exemplary embodiment. In the foregoing examples, a reflector may be used to acquire a plurality of captured images. Referring to FIG. 17, a plurality of captured images may be acquired by using a plurality of physical cameras 1710 instead of the reflector. An estimation apparatus may estimate a transformation parameter of a virtual screen relative to at least one of a plurality of physical cameras 1710 by using a physical pattern 1720 and a virtual pattern 1730. The description of FIGS. 1 through 16 and 18 through 21 may also be applied to an operation of the estimation apparatus.

Figure 18:
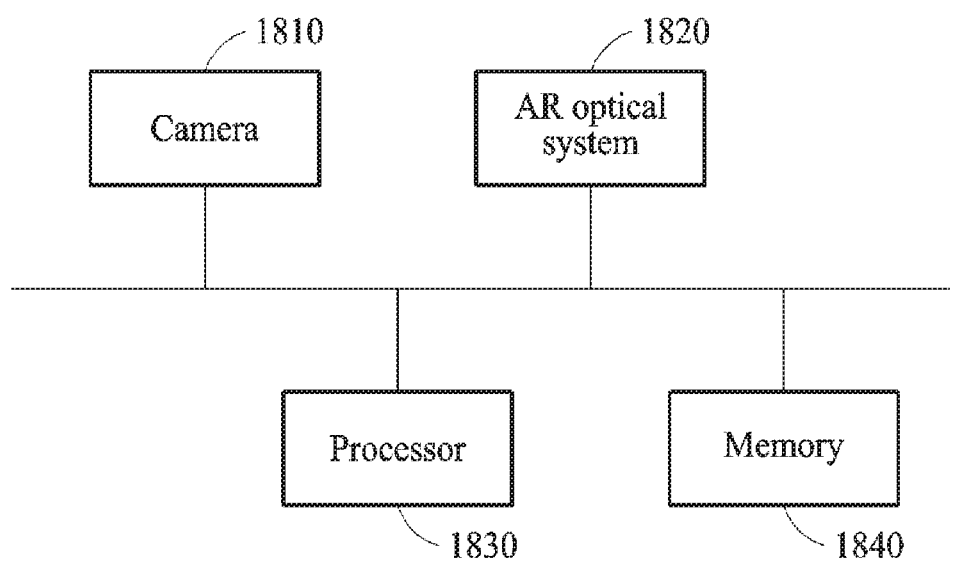
FIG. 18 is a block diagram illustrating an apparatus for estimating a parameter of a virtual screen, according to an exemplary embodiment.

FIG. 18 is a block diagram illustrating an apparatus for estimating a parameter of a virtual screen, according to an exemplary embodiment. Referring to FIG. 18, an estimation apparatus 1800 may include a camera 1810, an AR optical system 1820, a processor 1830, and a memory 1840. The camera 1810 may be an image sensor that includes a plurality of pixels and that is configured to capture a color image or a gray scale image. A captured image of the camera 1810 may be provided to at least one of the processor 1830 and the memory 1840. The AR optical system 1820 may include a light source, a display panel, and at least one optical element. The display panel and the light source may be used to provide light that corresponds to an AR image. The at least one optical element may reflect the light that corresponds to the AR image toward a transparent optical element. For example, an LED or a laser may be used as the light source. The light that corresponds to the AR image may be provided by the AR optical system 1820 to form a virtual screen 130. Further, a portion of the light provided by the AR optical system 1820 may be reflected by the transparent optical element, which is positioned in front of a user, and thereby provided to the user.

The memory 1840 may include an instruction to be read by the processor 1830. When the instruction is executed in the processor 1830, the processor 1830 may perform an operation to estimate a parameter of a virtual screen. The processor 1830 may acquire, from a physical camera, a plurality of captured images that represent a reflector reflecting a virtual pattern displayed on the virtual screen and a physical pattern displayed on a physical plane, estimate virtual cameras that correspond to the physical camera for each reflection angle of the reflector, determine first transformation parameters of the virtual cameras relative to a reference camera of the virtual cameras based on transformation parameters of the virtual cameras relative to the physical pattern, determine second transformation parameters of the virtual cameras relative to the reference camera based on transformation parameters of the virtual cameras relative to the virtual pattern, and estimate a size parameter of the virtual screen based on the first transformation parameters and the second transformation parameters. The description of FIGS. 1 through 17 and 19 through 21 may also be applied to the estimation apparatus 1800.

Figure 19:
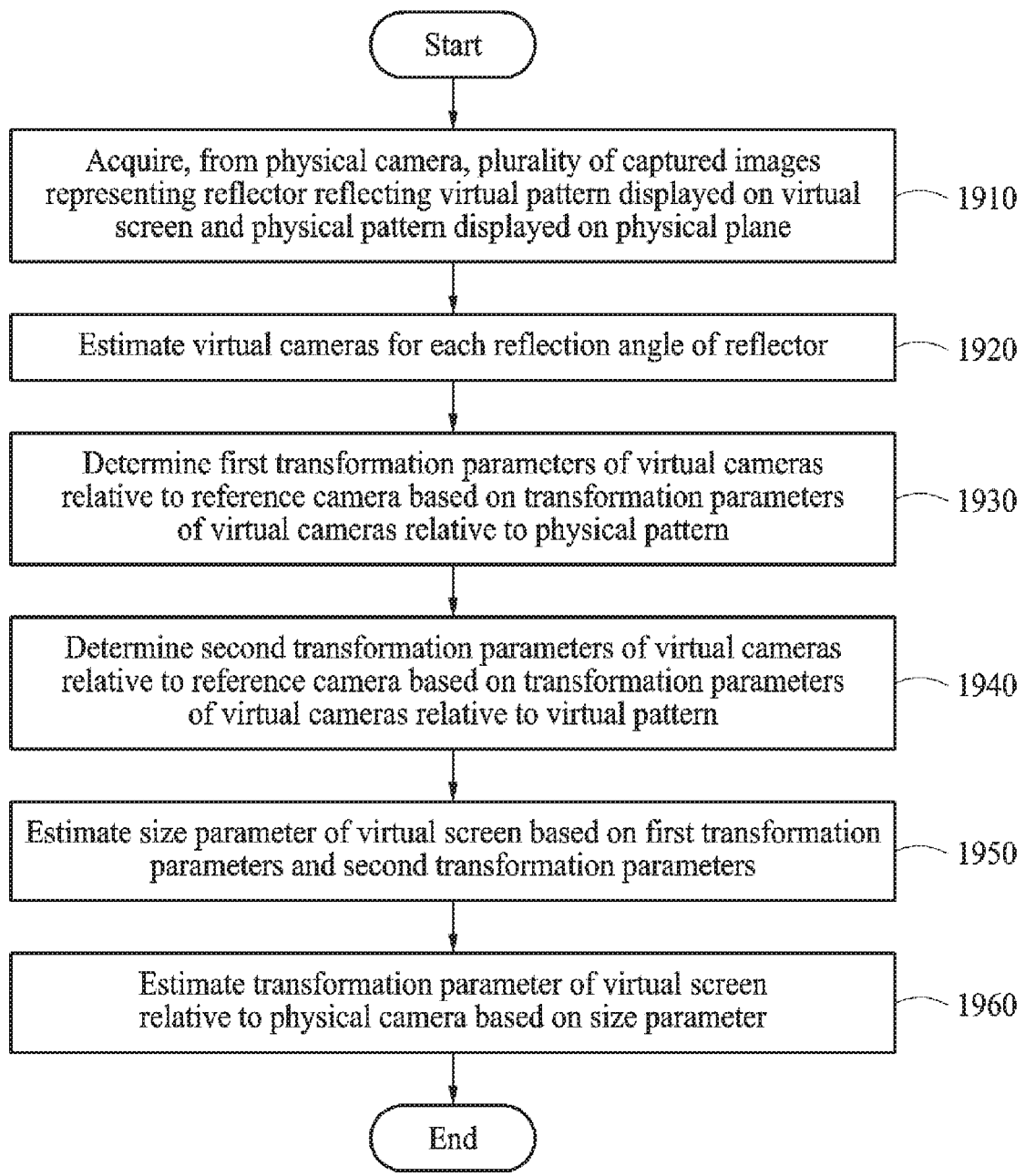
FIG. 19 is a flowchart illustrating a method of estimating a parameter of a virtual screen, according to an exemplary embodiment.

FIG. 19 is a flowchart illustrating a method of estimating a parameter of a virtual screen, according to an exemplary embodiment. Referring to FIG. 19, in operation 1910, an estimation apparatus may acquire, from a physical camera, a plurality of captured images that represent a reflector reflecting a virtual pattern displayed on a virtual screen and a physical pattern displayed on a physical plane. In operation 1920, the estimation apparatus may estimate virtual cameras that correspond to the physical camera for each reflection angle of the reflector. In operation 1930, the estimation apparatus may determine first transformation parameters of the virtual cameras relative to a reference camera of the virtual cameras based on transformation parameters of the virtual cameras relative to the physical pattern. In operation 1940, the estimation apparatus may determine second transformation parameters of the virtual cameras relative to the reference camera based on transformation parameters of the virtual cameras relative to the virtual pattern. In operation 1950, the estimation apparatus may estimate a size parameter of the virtual screen based on the first transformation parameters and the second transformation parameters. In operation 1960, the estimation apparatus may estimate a transformation parameter of the virtual screen relative to the physical camera based on the estimated size parameter. The description of FIGS. 1 through 18 may also be applied to the method of estimating the parameter of the virtual screen.

Figure 20:
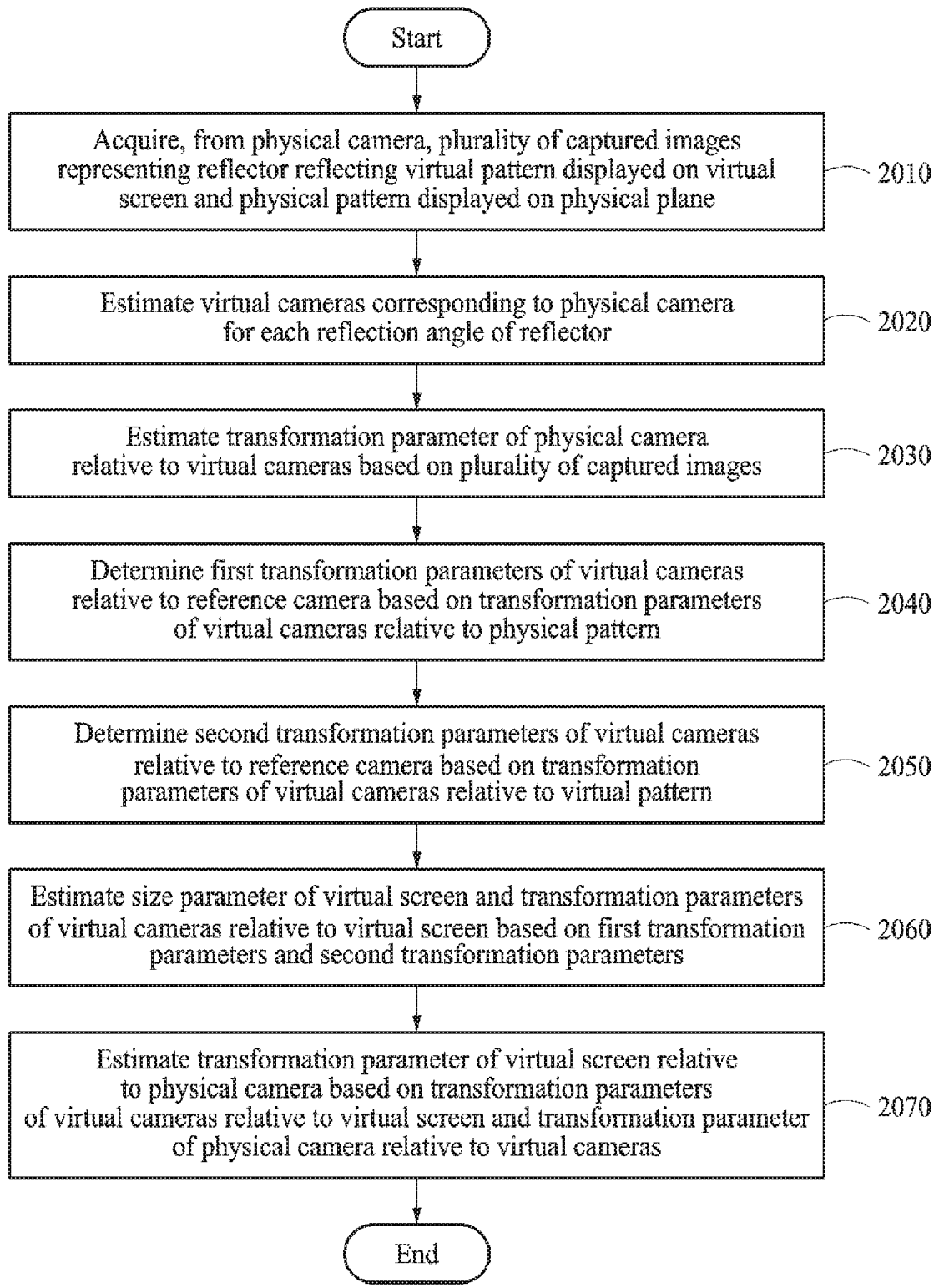
FIG. 20 is a flowchart illustrating a method of estimating a parameter of a virtual screen, according to an exemplary embodiment.

FIG. 20 is a flowchart illustrating a method of estimating a parameter of a virtual screen, according to an exemplary embodiment. Referring to FIG. 20, in operation 2010, an estimation apparatus may acquire, from a physical camera, a plurality of captured images that represent a reflector reflecting a virtual pattern displayed on a virtual screen and a physical pattern displayed on a physical plane. In operation 2020, the estimation apparatus may estimate virtual cameras that correspond to the physical camera for each reflection angle of the reflector. In operation 2030, the estimation apparatus may estimate a transformation parameter of the physical camera relative to the virtual cameras based on the plurality of captured images. In operation 2040, the estimation apparatus may determine first transformation parameters of the virtual cameras relative to a reference camera of the virtual cameras based on transformation parameters of the virtual cameras relative to the physical pattern. In operation 2050, the estimation apparatus may determine second transformation parameters of the virtual cameras relative to the reference camera based on transformation parameters of the virtual cameras relative to the virtual pattern. In operation 2060, the estimation apparatus may estimate a size parameter of the virtual screen and transformation parameters of the virtual cameras relative to the virtual screen based on the first transformation parameters and the second transformation parameters. In operation 2070, the estimation apparatus may estimate a transformation parameter of the virtual screen relative to the physical camera based on the transformation parameters of the virtual cameras relative to the virtual screen and a transformation parameter of the physical camera relative to the virtual cameras. The description of FIGS. 1 through 18 may also be applied to the method of estimating the parameter of the virtual screen.

FIG. 21 is a flowchart illustrating a method of estimating a parameter of a virtual screen, according to an exemplary embodiment. Referring to FIG. 21, in operation 2110, an estimation apparatus may acquire, from a physical camera, a plurality of captured images that represent a reflector that includes a physical pattern and reflects a virtual pattern displayed on a virtual screen. In operation 2120, the estimation apparatus may estimate virtual cameras that correspond to the physical camera for each reflection angle of the reflector. In operation 2130, the estimation apparatus may estimate a transformation parameter of the physical camera relative to the virtual cameras based on a geometric relationship between the physical pattern and the reflector. In operation 2140, the estimation apparatus may determine first transformation parameters of the virtual cameras relative to a reference camera of the virtual cameras based on transformation parameters of the virtual cameras relative to the physical pattern. In operation 2150, the estimation apparatus may determine second transformation parameters of the virtual cameras relative to the reference camera based on transformation parameters of the virtual cameras relative to the virtual pattern. In operation 2160, the estimation apparatus may estimate a size parameter of the virtual screen and transformation parameters of the virtual cameras relative to the virtual screen based on the first transformation parameters and the second transformation parameters. In operation 2170, the estimation apparatus may estimate a transformation parameter of the virtual screen relative to the physical camera based on the transformation parameters of the virtual cameras relative to the virtual screen and a transformation parameter of the physical camera relative to the virtual cameras. The description of FIGS. 1 through 18 may also be applied to the method of estimating the parameter of the virtual screen.

The units and/or modules described herein may be implemented using hardware components and/or software components. For example, the hardware components may include microphones, amplifiers, band-pass filters, audio to digital convertors, and processing devices. A processing device may be implemented by using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor, and/or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as a configuration that implements parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media that include program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as compact disc-read-only memory (CD-ROM) discs, digital versatile discs (DVDs), and/or Blue-ray discs; magneto-optical media such as optical discs; and hardware devices that are specially configured to store and perform program instructions, such as read-only memory (ROM), random access memory (RAM), flash memory (e.g., universal serial bus (USB) flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of estimating a parameter of a virtual screen, the method comprising:
    acquiring, from a physical camera, a plurality of captured images that represent a reflector reflecting a virtual pattern displayed on a virtual screen and a physical pattern displayed on a physical plane, each captured image from among the plurality of captured images corresponding to a respective reflection angle of the reflector;
    associating each captured image from among the plurality of captured images with a respective virtual camera from among a plurality of virtual cameras that correspond to the physical camera;
    determining, for each respective virtual camera from among the plurality of virtual cameras, at least one first transformation parameter relative to a reference camera of the plurality of virtual cameras based on physical pattern transformation parameters of the plurality of virtual cameras that relate to the physical pattern;
    determining, for each respective virtual camera from among the plurality of virtual cameras, at least one second transformation parameter relative to the reference camera based on virtual pattern transformation parameters of the plurality of virtual cameras that relate to the virtual pattern; and
    estimating a size parameter of the virtual screen based on each of the at least one first transformation parameter and each of the at least one second transformation parameter.

2. The method of claim 1, wherein the estimating the size parameter comprises estimating a value that corresponds to a minimum difference between a respective one from among the at least one first transformation parameter and a corresponding one from among the at least one second transformation parameter.

3. The method of claim 1, wherein the estimating the size parameter comprises:
    determining each of the at least one second transformation parameter based on a candidate size parameter;
    determining a respective difference between each respective one from among the at least one first transformation parameter and each corresponding one from among the at least one second transformation parameter determined based on the candidate size parameter;
    comparing each determined respective difference to a threshold; and
    estimating the candidate size parameter to be the size parameter based on a result of the comparing.

4. The method of claim 1, further comprising:
    estimating a third transformation parameter of the virtual screen relative to the physical camera based on the size parameter.

5. The method of claim 4, wherein the estimating the third transformation parameter of the virtual screen comprises:
    estimating geometric relationships between the virtual pattern and the reflector based on the plurality of captured images;
    calculating a projection error between at least one virtual image of the virtual pattern in the plurality of captured images and the virtual pattern based on the geometric relationships; and
    estimating the third transformation parameter of the virtual screen relative to the physical camera such that the projection error is minimized.

6. The method of claim 1, further comprising:
    estimating a third transformation parameter of the virtual screen relative to the physical camera based on at least one fourth transformation parameter of the plurality of virtual cameras relative to the virtual screen and a fifth transformation parameter of the physical camera relative to the plurality of virtual cameras.

7. The method of claim 6, further comprising:
    estimating the fifth transformation parameter of the physical camera relative to the plurality of virtual cameras based on the plurality of captured images.

8. The method of claim 6, further comprising:
    estimating the at least one fourth transformation parameter of the plurality of virtual cameras relative to the virtual screen based on each of the at least one first transformation parameter and each of the at least one second transformation parameter.

9. The method of claim 7, wherein the estimating the fifth transformation parameter of the physical camera relative to the plurality of virtual cameras comprises:
    estimating geometric relationships between the physical pattern and the reflector based on the plurality of captured images;
    calculating a projection error between at least one virtual image of the physical pattern in the plurality of captured images and the physical pattern based on the geometric relationships; and
    estimating the fifth transformation parameter of the physical camera relative to the plurality of virtual cameras such that the projection error is minimized.

10. The method of claim 1, wherein each of the plurality of captured images is acquired by adjusting the reflection angle of the reflector.

11. A non-transitory computer-readable storage medium storing instructions that, when executed by a processor, cause the processor to perform the method of claim 1.

12. The method of claim 1, wherein the physical pattern is positioned on the reflector.

13. A method of estimating a parameter of a virtual screen, the method comprising:
    acquiring, from a physical camera, a plurality of captured images that represent a reflector that includes a physical pattern and that reflects a virtual pattern displayed on a virtual screen, each captured image from among the plurality of captured images corresponding to a respective reflection angle of the reflector;
    associating each captured image from among the plurality of captured images with a respective virtual camera from among a plurality of virtual cameras that correspond to the physical camera;
    determining, for each respective virtual camera from among the plurality of virtual cameras, at least one first transformation parameter relative to a reference camera of the plurality of virtual cameras based on physical pattern transformation parameters of the plurality of virtual cameras that relate to the physical pattern;
    determining, for each respective virtual camera from among the plurality of virtual cameras, at least one second transformation parameter relative to the reference camera based on virtual pattern transformation parameters of the plurality of virtual cameras that relate to the virtual pattern; and estimating a size parameter of the virtual screen based on each of the at least one first transformation parameter and each of the at least one second transformation parameter.

14. The method of claim 13, further comprising:
estimating a third transformation parameter of the virtual screen relative to the physical camera based on at least one fourth transformation parameter of the plurality of virtual cameras relative to the virtual screen and a fifth transformation parameter of the physical camera relative to the plurality of virtual cameras.

15. The method of claim 14, further comprising:
estimating the fifth transformation parameter of the physical camera relative to the plurality of virtual cameras based on a geometric relationship between the physical camera and the reflector.

16. The method of claim 14, further comprising:
estimating the at least one fourth transformation parameter of the plurality of virtual cameras relative to the virtual screen based on each of the at least one first transformation parameter and each of the at least one second transformation parameter.

17. An apparatus for estimating a parameter of a virtual screen, the apparatus comprising:
a processor; and
a memory that includes an instruction to be read by the processor,
wherein the processor is configured to execute the instruction to:
acquire, from a physical camera, a plurality of captured images that represent a reflector reflecting a virtual pattern displayed on a virtual screen and a physical pattern displayed on a physical plane, each captured image from among the plurality of captured images corresponding to a respective reflection angle of the reflector;
associate each captured image from among the plurality of captured images with a respective virtual camera from among a plurality of virtual cameras that correspond to the physical camera;
determine, for each respective virtual camera from among the plurality of virtual cameras, at least one first transformation parameter relative to a reference camera of the plurality of virtual cameras based on physical pattern transformation parameters of the plurality of virtual cameras that relate to the physical pattern;
determine, for each respective virtual camera from among the plurality of virtual cameras, at least one second transformation parameter relative to the reference camera based on virtual pattern transformation parameters of the plurality of virtual cameras that relate to the virtual pattern; and
estimate a size parameter of the virtual screen based on each of the at least one first transformation parameter and each of the at least one second transformation parameter.

18. The apparatus of claim 17, wherein the processor is further configured to estimate a value that corresponds to a minimum difference between a respective one from among the at least one first transformation parameter and a corresponding one from among the at least one second transformation parameter.

19. The apparatus of claim 17, wherein the processor is further configured to estimate a third transformation parameter of the virtual screen relative to the physical camera based on the size parameter.

20. The apparatus of claim 17, wherein the processor is further configured to estimate a third transformation parameter of the virtual screen relative to the physical camera based on at least one fourth transformation parameter of the plurality of virtual cameras relative to the virtual screen and a fifth transformation parameter of the physical camera relative to the plurality of virtual cameras.

21. The apparatus of claim 17, wherein each of the plurality of captured images is acquired by adjusting the reflection angle of the reflector.

* * * * *